(12) United States Patent
Bradley et al.

(10) Patent No.: US 10,198,648 B1
(45) Date of Patent: Feb. 5, 2019

(54) DECODING 1D-BARCODES IN DIGITAL CAPTURE SYSTEMS

(71) Applicant: Digimarc Corporation, Beaverton, OR (US)

(72) Inventors: Brett A. Bradley, Portland, OR (US); Ajith M. Kamath, Beaverton, OR (US); Tomas Filler, Beaverton, OR (US); Vojtech Holub, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/094,925

(22) Filed: Apr. 8, 2016

Related U.S. Application Data

(60) Provisional application No. 62/146,133, filed on Apr. 10, 2015, provisional application No. 62/181,673,
(Continued)

(51) Int. Cl.
*G06K 9/00* (2006.01)
*G06K 9/18* (2006.01)
(Continued)

(52) U.S. Cl.
CPC ............... *G06K 9/18* (2013.01); *G06K 9/52* (2013.01); *G06K 9/6267* (2013.01);
(Continued)

(58) Field of Classification Search
CPC .......... G06K 9/18; G06K 9/52; G06K 9/6267; H04N 19/44; H04N 19/90; G06T 7/0012
See application file for complete search history.

(56) References Cited

U.S. PATENT DOCUMENTS 5,278,398 A   1/1994 Pavlidis
5,821,519 A * 10/1998 Lee ..................... G06K 7/14
                                              235/462.27
(Continued)

FOREIGN PATENT DOCUMENTS

CN    102254295 A   11/2011
CN    102592256 A    2/2015
(Continued)

OTHER PUBLICATIONS

Rohs, Michael, et al., "Using Camera-Equipped Mobile Phones for Interacting with Real-World Objects", Advances in Pervasive Computing, [Online], Retrieved from the Internet, URL: <http://citeseer.ist.psu.edu/viewdoc/sunnnnary?doi=10.1.1.2.7195>, 7 pgs (Year: 2004).*
(Continued)

*Primary Examiner* — Amara Abdi
(74) *Attorney, Agent, or Firm* — Digimarc Corporation

(57) ABSTRACT

The present disclosure relates to advanced image signal processing technology including: i) rapid localization for machine-readable indicia including, e.g., 1-D and 2-D barcodes; and ii) barcode reading and decoders. One claim recites: a method for constructing a symbol template for use by a 1-dimensional (1D) barcode decoder, the barcode decoder configured for processing image data suspected of including a 1D barcode, said method comprising: obtaining a first symbol pattern representing a first symbol, the first symbol pattern comprising a plurality of elements, with each element corresponding to a 1D barcode space or bar; obtaining prefix elements, the prefix elements comprising a subset of second symbol elements from a second symbol pattern which precedes the first symbol from within a scanline of image data; extending the first symbol pattern with the prefix to yield an overlapping symbol template; and providing the overlapping symbol template for use in correlation-based
(Continued)

barcode decoding by the 1D barcode decoder. Of course other combinations and claims are provided too.

14 Claims, 13 Drawing Sheets

Related U.S. Application Data filed on Jun. 18, 2015, provisional application No. 62/315,600, filed on Mar. 30, 2016.

(51) Int. Cl.
```
G06T 7/00      (2017.01)
G06K 9/52      (2006.01)
G06K 9/62      (2006.01)
H04N 19/44     (2014.01)
H04N 19/90     (2014.01)
```

(52) U.S. Cl.
CPC ........... *G06T 7/0012* (2013.01); *H04N 19/44* (2014.11); *H04N 19/90* (2014.11)

(56) References Cited

U.S. PATENT DOCUMENTS

| | | |
|---|---|---|
| 5,859,920 A | 1/1999 | Daly et al. |
| 5,862,260 A | 1/1999 | Rhoads |
| 5,949,885 A | 9/1999 | Leighton |
| 6,122,403 A | 9/2000 | Rhoads |
| 6,175,627 B1 | 1/2001 | Petrovic et al. |
| 6,208,735 B1 | 3/2001 | Cox et al. |
| 6,345,104 B1 | 2/2002 | Rhoads |
| 6,408,082 B1 | 6/2002 | Rhoads et al. |
| 6,449,377 B1 | 9/2002 | Rhoads |
| 6,590,996 B1 | 7/2003 | Reed et al. |
| 6,614,914 B1 | 9/2003 | Rhoads et al. |
| 6,625,297 B1 | 9/2003 | Bradley |
| 6,687,385 B1 | 2/2004 | Handley |
| 6,704,869 B2 | 3/2004 | Rhoads et al. |
| 6,718,046 B2 | 4/2004 | Reed et al. |
| 6,763,123 B2 | 7/2004 | Reed et al. |
| 6,778,679 B1 | 8/2004 | Handley |
| 6,891,959 B2 | 5/2005 | Reed et al. |
| 6,912,295 B2 | 6/2005 | Reed et al. |
| 6,947,571 B1 | 9/2005 | Rhoads et al. |
| 7,013,021 B2 | 3/2006 | Gustafson |
| 7,046,819 B2 | 5/2006 | Sharma et al. |
| 7,054,461 B2 | 5/2006 | Zeller et al. |
| 7,116,781 B2 | 10/2006 | Rhoads |
| 7,130,442 B2 | 10/2006 | Braudaway et al. |
| 7,657,058 B2 | 2/2010 | Sharma |
| 7,738,709 B2 | 6/2010 | Shi et al. |
| 7,986,807 B2 | 7/2011 | Stach et al. |
| 8,224,017 B2 | 7/2012 | Shi et al. |
| 8,243,980 B2 | 8/2012 | Rhoads et al. |
| 8,281,138 B2 | 10/2012 | Shi et al. |
| 8,308,068 B2 | 11/2012 | Morgana |
| 8,413,903 B1* | 4/2013 | Dhua .................... G06K 7/1439 235/462.09 |
| 8,457,414 B2 | 6/2013 | Jahanbin et al. |
| 8,523,075 B2 | 9/2013 | Van Der Merwe |
| 8,636,224 B2 | 1/2014 | Wang |
| 8,733,650 B1 | 5/2014 | Segal |
| 8,755,837 B2* | 6/2014 | Rhoads ............. G06F 17/30244 455/556.1 |
| 8,851,382 B2 | 10/2014 | Powers |
| 8,905,314 B2 | 12/2014 | Van Der Merwe |
| 8,917,944 B2 | 12/2014 | Suomela |
| 8,965,038 B2 | 2/2015 | Liu |
| 9,098,764 B2 | 8/2015 | Gallo |
| 9,224,184 B2 | 12/2015 | Bai |
| 9,262,633 B1 | 2/2016 | Todeschini |
| 9,380,186 B2 | 6/2016 | Reed et al. |
| 9,396,377 B2 | 7/2016 | Van Der Merwe |
| 9,521,291 B2 | 12/2016 | Holub |
| 9,635,378 B2 | 4/2017 | Holub |
| 9,690,967 B1 | 6/2017 | Brundage |
| 9,805,225 B2 | 10/2017 | Kim |
| 9,892,301 B1 | 2/2018 | Holub |
| 9,946,963 B2 | 4/2018 | Samara |
| 9,984,429 B2 | 5/2018 | Holub |
| 2004/0221062 A1 | 11/2004 | Starbuck |
| 2007/0177791 A1 | 8/2007 | Shi et al. |
| 2008/0175429 A1 | 7/2008 | Shi et al. |
| 2009/0108071 A1 | 4/2009 | Carlson |
| 2009/0277962 A1 | 11/2009 | McCloskey |
| 2010/0037059 A1 | 2/2010 | Sun et al. |
| 2011/0068173 A1* | 3/2011 | Powers .................... G06K 7/14 235/462.06 |
| 2011/0222760 A1 | 9/2011 | Shi et al. |
| 2012/0080515 A1 | 4/2012 | van der Merwe |
| 2012/0091204 A1* | 4/2012 | Shi .......................... G06K 7/146 235/437 |
| 2012/0104100 A1 | 5/2012 | Gallo |
| 2012/0284339 A1 | 11/2012 | Rodriguez |
| 2013/0068841 A1 | 3/2013 | Santosa |
| 2013/0170765 A1* | 7/2013 | Santos .................... G06T 5/003 382/255 |
| 2013/0182972 A1 | 7/2013 | Jing et al. |
| 2013/0223673 A1 | 8/2013 | Davis et al. |
| 2013/0256416 A1 | 10/2013 | Wang |
| 2014/0112524 A1 | 4/2014 | Bai et al. |
| 2014/0142958 A1 | 5/2014 | Sharma et al. |
| 2014/0282664 A1 | 9/2014 | Lee |
| 2014/0324833 A1 | 10/2014 | Davis et al. |
| 2015/0030201 A1 | 1/2015 | Holub et al. |
| 2016/0275639 A1 | 9/2016 | Holub et al. |

FOREIGN PATENT DOCUMENTS

| | | |
|---|---|---|
| CN | 104680473 A | 6/2015 |
| CN | 104778702 A | 7/2015 |
| WO | WO2013033442 | 3/2013 |

OTHER PUBLICATIONS

Adelmann, Robert et al "Toolkit for bar code recognition and resolving on camera phones—Jump starting the internet of thinks", Retrieved from the internet:<URL: http://citeseerx.ist.psu.edu/viewdoc/summary?doi=10.1.1.69.5519>, 8 pgs. (Year: 2006).*
U.S. Appl. No. 61/856,476, filed Jul. 19, 2013.
U.S. Appl. No. 61/918,214, filed Dec. 19, 2013.
Assignee's U.S. Appl. No. 14/725,399, filed May 29, 2015, including filing receipt.
Assignee's U.S. Appl. No. 15/154,572, filed May 13, 2016, including filing receipt.
Assignee's U.S. Appl. No. 15/154,529, filed May 13, 2016, including filing receipt.
Machine Translation from EPO Patent Translate of CN102254295A (abstract, description and claims), machine translated on Aug. 30, 2016, 13 pages.
Machine Translation from EPO Patent Translate of CN102592256A (abstract, description and claims), machine translated on Aug. 30, 2016, 16 pages.
Machine Translation from EPO Patent Translate of CN104680473A (abstract, description and claims), machine translated on Aug. 30, 2016, 16 pages.
Machine Translation from EPO Patent Translate of CN104778702A (abstract, description and claims), machine translated on Aug. 30, 2016, 11 pages.
Avcibas, et al., "Steganalysis of Watermarking Techniques Using Images Quality Metrics", Proceedings of SPIE, Jan. 2001, vol. 4314, pp. 523-531.
Dautzenberg, "Watermarking Images," Department of Microelectronics and Electrical Engineering, Trinity College Dublin, 47 pages, Oct. 1994.
Hernandez et al., "Statistical Analysis of Watermarking Schemes for Copyright Protection of Images," Proceedings of the IEEE, vol. 87, No. 7, Jul. 1999.

(56) References Cited

OTHER PUBLICATIONS

Holub & Fridrich, "Digital image steganography using universal distortion," IH&MMSec '13 Proceedings of the first ACM workshop on Information hiding and multimedia security, pp. 59-68 (2013).

Kodovský, Fridrich & Holub, "On dangers of overtraining steganography to incomplete cover model," MM&Sec '11 Proceedings of the thirteenth ACM multimedia workshop on Multimedia and security, pp. 69-76 (2011).

Fridrich, Kodovský. & Holub, "Steganalysis of Content-Adaptive Steganography in Spatial Domain," Information Hiding, vol. 6958 of the series Lecture Notes in Computer Science pp. 102-117, 2011.

J. Fridrich and J. Kodovský. "Rich models for steganalysis of digital images," IEEE Trans. on Information Forensics and Security, 7(3):868-882, Jun. 2012.

J. Kodovský, J. Fridrich, and V. Holub, "Ensemble classifiers for steganalysis of digital media," IEEE Trans. on Inform. Forensics and Security, 7(2):432-444, Apr. 2012.

Pevný, P. Bas, and J. Fridrich, "Steganalysis by subtractive pixel adjacency matrix," IEEE Transactions on Information Forensics and Security, 5(2):215-224, Jun. 2010.

O'Ruanaidh, "Rotation, Scale and Translation Invariant Digital Image Watermarking," Signal Processing, pp. 2-15, May 1, 1998.

S. Pereira, J. J. K. Oruanaidh, F. Deguillaume, G. Csurka and T. Pun, Template Based Recovery of Fourier-Based Watermarks Using Log-polar and Log-log Maps, in Int. Conference on Multimedia Computing and Systems Jun. 1999.

R. O. Duda, P. E. Hart, and D. G. Stork, "Pattern Classification." Wiley Interscience, 2nd edition, 2000.

Chih-Chung Chang and Chih-Jen Lin "LIBSVM: A Library for Support Vector Machines," ACM Transactions on Intelligent Systems and Technology, vol. 2, No. 3, Article 27, Publication date: Apr. 2011.

Fan, et al., "LIBLINEAR: A Library for Large Linear Classification," Journal of Machine Learning Research 9 (2008) 1871-1874.

Sullivan et al., "Steganalysis of Spread Spectrum Data Hiding Exploiting Cover Memory", SPIE2005, vol. 5681, pp. 38-46.

Lyu et al., "Detecting Hidden Messages Using Higher-Order Statistics and Support Vector Machines," 5th International Workshop on Information Hiding, Noordwijkerhout, The Netherlands, 2002.

Fridrich et al., "Steganalysis of JPEG Images: Breaking the F5 algorithm", 5th Information Hiding Workshop, 2002, pp. 310-323.

Justus et al., "Performance Study of Specific and Universal Image Steganalysis Techniques," International Conference on Computing, Communication and Information Technology (ICCCIT 2012), Jun. 27-29, 2012.

Wang et al., "1D bar code reading on camera phones," International Journal of Image and Graphics, vol. 7, No. 3, pp. 529550, 2007, World Scientific Publishing.

Sörös, "GPU-accelerated joint 1D and 2D barcode localization on smartphones," 2014 IEEE International Conference on Acoustics, Speech and Signal Processing (ICASSP), 5095-5099.

Sörös, "Blur-resistant joint 1D and 2D barcode localization for smartphones," MUM'13, Dec. 2-5, 2013, Lulea, Sweden.

Zamberletti et al., "Neural 1D Barcode Detection Using the Hough Transform," IPSJ Transactions on Computer Vision and Applications 7:0, 1-9. Jan. 2015.

Grosz et al, "QR Code Localization using Deep Neural Networks," 2014 IEEE International Workshop on Machine Learning for Signal Processing, Sep. 21-24, 2014, Reims, France.

Reyna, et al., "Segmenting Images with Support Vector Machines," Image Processing, 2000, Proceedings, 2000 International Conference on. vol. 1. IEEE, 2000.

Leong et al., "Extraction of 2D Detection," 2009, Advances in Barcode Using Multimedia Information Keypoint Selection and Line Processing—PCM 2009, 826-835.

Zamberletti et al., "Robust Angle Invariant 1D Barcode Detection," Pro. Asian Conf. on Pattern Recognition (ACPT'13), pp. 160-164, 2013.

Bodnar et al., "Improved QR Code Localization Using Boosted Cascade of Weak Classifiers," Acta Cybernetica 22 (2015) 21-33.

Bodnar, "Image analysis method for localization of visual codes," Theses of PhD Dissertation, PhD School in Computer Science, University of Szeged, 16 pages, 2015.

Adelmann, Robert, et al., "Toolkit for Bar Code Recognition and Resolving on Camera Phones—Jump Starting the Internet of Things", [Online]. Retrieved from the Internet: <URL: http://citeseerx.ist.psu.edu/viewdoc/summary?doi=10.1.1.69.5519 (2006), 8 pgs.

Rohs, Michael, et al., "Using Camera-Equipped Mobile Phones for Interacting with Real-World Objects", Advances in Pervasive Computing, [Online]. Retrieved from the Internet: <URL: http://citeseer.ist.psu.edu/viewdoc/summary?doi=10.1.1.2.7195>, (2004), 7 pgs.

\* cited by examiner

Left Side 2, 5 & 0 Codes

Right Side 2, 5 & 0 Codes

DECODING 1D-BARCODES IN DIGITAL CAPTURE SYSTEMS

RELATED APPLICATIONS

This application claims the benefit of US Provisional Patent Application Nos. 62/146,133, filed Apr. 10, 2015, 62/181,673, filed Jun. 18, 2015, and 62/315,600, filed Mar. 30, 2016. Each of these patent documents is hereby incorporated herein by reference in its entirety.

This application is also related to U.S. patent application Ser. No. 15/059,690, filed Mar. 3, 2016, which claims the benefit of U.S. Provisional Application No. 62/128,806, filed Mar. 5, 2015. The present application is also related to Ser. No. 14/332,739, filed Jul. 16, 2014 (published as US 2015-0030201 A1), which claims the benefit of US Provisional Patent Application Nos. 61/856,476, filed Jul. 19, 2013, and 61/918,214, filed Dec. 19, 2013. The present application is also related to assignee's U.S. patent application Ser. No. 14/616,686, filed Feb. 2, 2015 (published as US 2015-0156369 A1; issued as U.S. Pat. No. 9,380,186) and U.S. Provisional Patent Application No. 62/298,923, filed Feb. 23, 2016.

Each of the above patent documents is hereby incorporated herein by reference in its entirety. Such incorporation by reference, and all following incorporations by reference, are intended to incorporate the entire application including the entire specification, all drawings and any appendices, even if a patent document is only discussed with respect to a specific portion thereof.

REFERENCE TO COMPUTER PROGRAM LISTINGS

This application includes computer program listings, including the following files: i) "Appendix_A.txt", created on Apr. 8, 2016, having 47,031 bytes (49,152 bytes on disk); ii) "Appendix_B.txt", created on Apr. 7, 2016, having 5,713 bytes (8,192 bytes on disk); and iii) "Appendix_C.txt", created on Apr. 8, 2016, having 276,942 bytes (278,528 bytes on disk), each of which forms part of this disclosure, and each of which is hereby incorporated herein by reference. The Appendices include MatLab code and are organized according to function names, and not necessarily overall application flow.

TECHNICAL FIELD

The disclosure relates to advanced image processing technology including: i) rapid localization for machine-readable indicia including, e.g., 1-D and 2-D barcodes; and ii) barcode reading and decoding.

BACKGROUND AND SUMMARY

The disclosure generally focuses on localizing (e.g., finding) and decoding (e.g., reading) machine-readable indicia, such a 1-D and 2-D barcodes. While specific examples are provided for 1-D barcodes (e.g., so-call Universal Product Codes or UPC), the disclosed technology can be readily used for other types of 1-D (e.g., EAN-13, EAN-8, Code128, ITFR-14, Code39, DataCodes, etc.) and 2-D (e.g., QR code, Aztec, Code 49, DataMatrix, etc.) symbologies.

A Universal Product Code (or UPC) is a barcode symbology that is used primarily for retail items. UPC codes include two formats, UPC-A (conveying 12 numerical digits) and UPC-E (conveying 6 numerical digits). With reference to FIGS. 4 & 5, a UPC-A barcode includes a plurality of black bars and white spaces, with each digit (or "symbol") represented by a unique pattern of two bars and two spaces. These bars and spaces can have various widths, more than two elements, however. The horizontal dimensional parameter is called the x-dimension, and includes the preferred width of a single "module" element. A single x-dimension element is uniform within a UPC barcode. The bars and spaces can include variable width as long as the width remains uniform across the x-dimension; for example, they may be one, two, three, or four modules wide. The total width for a digit includes seven modules. For example, the left-hand "4" digit is space×1, bar×1, space×3, bar×2. To represent 12 digits of UPC-A code, 7 modules×12 digits=84 modules.

With reference to FIG. 5A, dark bars form Start (S), Middle (M), and End (E) guard bars and extend downwards by about 5 times the x-dimension. A quiet zone is included on each side of the scannable area of the UPC-A barcode. UPC-A includes 95 modules: 84 modules for the digits (L and R) and 11 modules for the start, middle, and end (S, M, and E) patterns. The S and E patterns are three modules wide and use the pattern bar-space-bar; each bar and space is one module wide. The M pattern is five modules wide and uses the pattern space-bar-space-bar-space; each bar and space is one module wide. In addition, a UPC code includes a quiet zone (additional space modules) before the S pattern and another quiet zone after the E pattern. The UPC's left-side digits (the digits to the left of the middle guard bars) have odd parity, which means the total width of the black bars is an odd number of modules. The right-hand side digits have even parity. UPC scanners can determine whether it is scanning a UPC from left-to-right or from right-to-left by considering the parity.

A few binary patterns for some left and right digits (or "symbols") (2, 5, 0) are shown with reference to FIGS. 5B and 5C. Recall from above that each bar (b) and space (s) is one module wide for a UPC. For a left side "2" digit, the bit pattern is "ssbssbh" or 0010011. For a right side "2" digit (or "symbol"), the bit pattern is "bbsbbss" or 1101100. In another example, the left side "0" bit pattern is "sssbbsb" or 0001101, with the right side "0" pattern is "bbbssbs" or 1110010. You'll notice that the left and right side digits are bitwise complements. A full table for all such left and right digits is provided herein.

UPC-A barcodes include the pattern "SLLLLLLMR-RRRRRE" where the S (start), M (middle), and E (end) guard bars are represented the same on each UPC and the L (6 digits left) and R (6 digits right) sections collectively represent unique 12 numerical symbols or digits. The first digit L indicates a particular number system to be used by the following digits. The last digit R is an error detecting check digit that provides error detection.

An EAN-1.3 barcode is a 13 symbol (12 data and 1 check) barcode standard which is a superset of the 12-digit UPC-A system. To encode an EAN-13 barcode, the digits are split into 3 groups; the first digit, the first group of 6 digits and the last group of 6 digits. If the first digit is zero, all digits in the first group of six are encoded using the patterns used for UPC, therefore, a UPC barcode is also an EAN-13 barcode with the first digit set to zero. Otherwise, for EAN-13, the first group of six is encoded using a scheme whereby each digit has two possible encodings, one of which has even parity and one of which has odd parity. All digits in the last group of six digits are encoded using a single set of patterns which are the same patterns used for UPC. For easy of discussion, we'll focus on the UPC-A case.

However, it should be understood that the technology disclosed herein is applicable to other EAN-13 formats as well.

One aspect of the present technology is an image processing apparatus comprising: an image sensor for obtaining data representing imagery; memory for storing a plurality of barcode symbol templates, and one or more configured processors. The plurality of barcode symbol templates comprises a template for each numerical digit 0-9 and one or more templates for synchronization symbols, wherein for each of the numerical digits the plurality of templates comprises one or more scaled versions of the digit template, and wherein the symbol template comprises a plurality of elements. The one or more processors are configured for: analyzing a scanline representing a portion of the data representing imagery by correlating information associated with one or more suspected barcode symbols within the scanline with the plurality of barcode symbol templates, updating an estimated scale of the scanline based upon a result of said correlating; and outputting a barcode ID associated with the scanline.

Another aspect of the technology includes a method for constructing a symbol template for use by a 1-dimensional (1D) barcode decoder, the barcode decoder configured for processing image data suspected of including a 1D barcode, said method comprising: obtaining a first symbol pattern representing a first symbol, the first symbol pattern comprising a plurality of elements, with each element corresponding to a ID barcode space or bar; obtaining prefix elements, the prefix elements comprising a subset of second symbol elements from a second symbol pattern which precedes the first symbol from within a scanline of image data; extending the first symbol pattern with the prefix to yield an overlapping symbol template; and providing the overlapping symbol template for use in correlation-based barcode decoding by the 1D barcode decoder.

Still another aspect includes an image processing method comprising: obtaining 2D image data representing a 1D barcode within a first image area; generating a plurality of scanlines across the first image area; for each of the plurality of scanlines: synchronizing the scanline, including decoding an initial set of numerical digits represented by the scanline, in which said synchronizing provides a scale estimate for the scanline; using a path decoder to decode remaining numerical digits within the scanline, the path decoder decoding multiple numerical digits in groups; and providing decoded numerical digits as an identifier represented by the scanline.

This disclosure also includes a description for advanced image processing technology including: i) rapid localization for machine-readable indicia including, e.g., D and 2-D barcodes; and ii) barcode reading and decoders.

Of course these and many other aspects, features and embodiments are described in detail herein.

DETAILED DESCRIPTION

Overview:

We describe various barcode decoders in this patent document. A barcode decoder operates to localize and/or decode a barcode symbology. For example, a barcode decoder may include technology for localization of barcode indicia within digital images and/or technology for decoding certain barcodes (e.g., 1D UPC codes, among others). To be clear, a barcode decoder need not include a localization module, and can instead operate on image data as input.

With constant improvement in smart phones (e.g., phones including digital cameras and one or more processors) and introduction of imaging (e.g., image capture-based vs. red laser) checkout scanners (e.g., at grocery stores), the need for decoding machine readable indicia from captured image data becomes more readily apparent; as does the need for rapidly locating machine-readable indicia within captured imagery. Some forms of machine-readable indicia include digital watermarking, 1-D barcodes, 2-D barcodes such as QR codes, data glyphs, cryptographs, etc.

Figure 1:
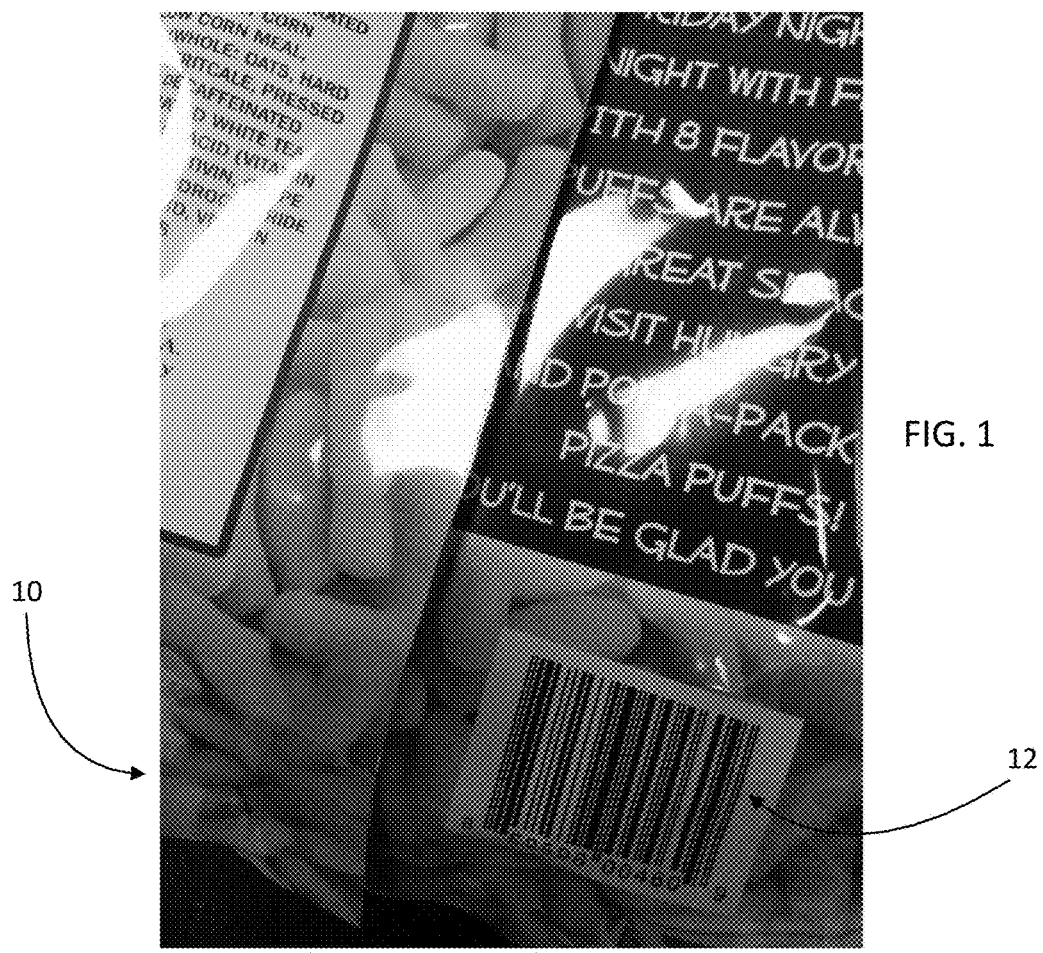
FIG. 1 is a color image captured with a camera, the image including a representation of a 1 dimensional (1D) barcode (UPC).

In practice, some forms of machine-readable indicia, like barcodes, occupy a relatively small area of an overall image frame. For example, FIG. 1 shows an image data frame 10 including an area 12 in which machine-readable indicia is included (e.g., a UPC barcode). Since indicia readers may run on mobile devices with limited time and processing budget for image frames, it is important to localize any machine-readable indicia versus examining every image area for the indicia. The term "localizing" (and other forms of the word) is generally used in this document to mean detecting, locating, bounding, identifying, estimating and/or predicting digital image areas that likely include machine-readable indicia. A machine-readable indicia reader (e.g., a barcode decoder) can focus on localized areas identified as likely including machine-readable indicia, therefore saving precious computation time. For example, instead of directing a barcode decoder at all image areas, the decoder can focus initially on (or only on) those likely to include the indicia.

Figure 11:
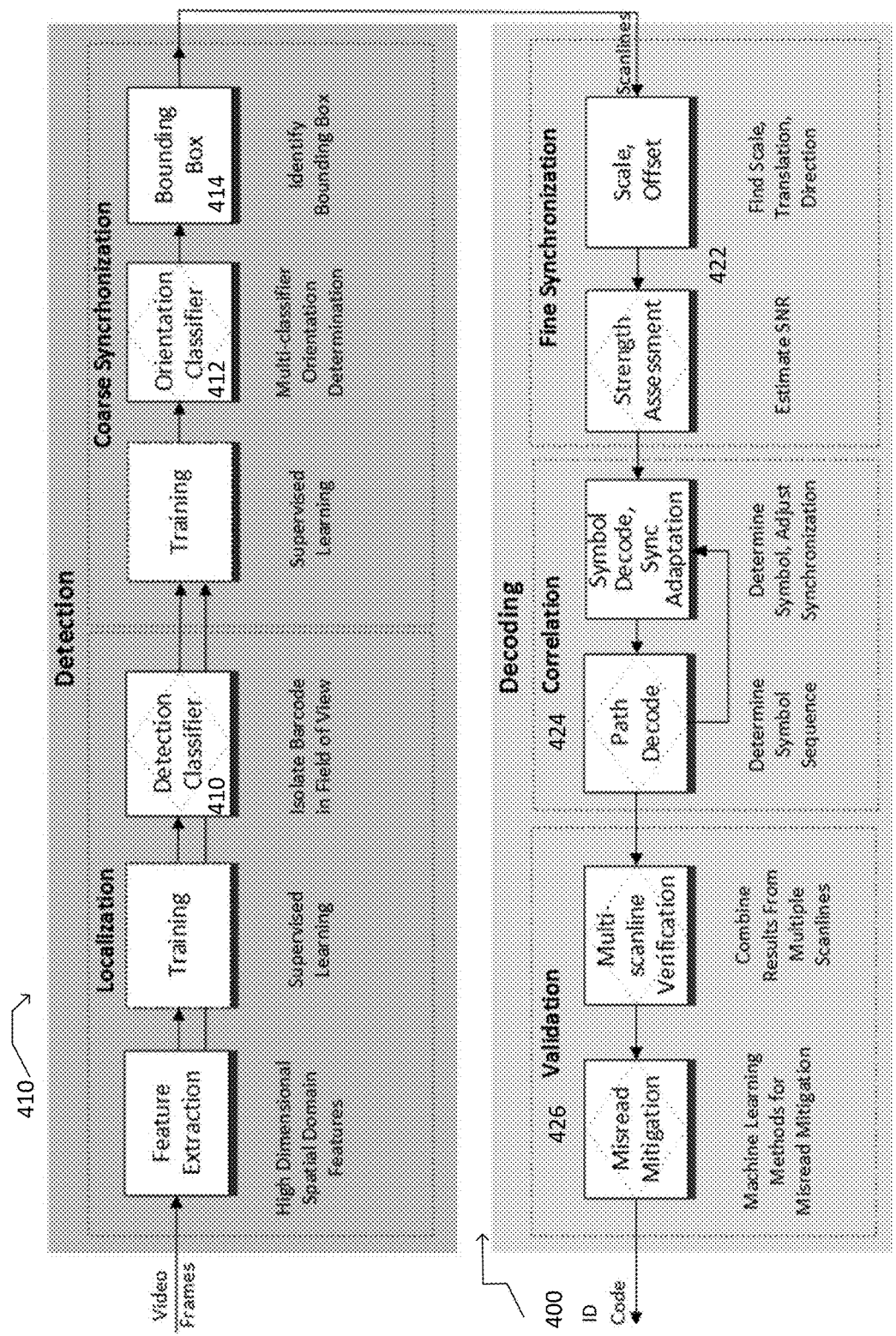
FIG. 11 is a diagram showing an overall flow for barcode decoding in one example.

As a brief overview, and with reference to FIG. 11, barcode decoding 400 can be broken into two general stages:

Detection 410 and Decoding 420. As discussed below, barcode Detection 410 can be further divided into various sub-stages, e.g., localization and coarse synchronization. (It may help to conceptually model barcode reading as a digital communications problem, including considering detection process as information bits communicated through a noisy channel with bit sequences mapped to symbols. Some elements at the communication channel's "receiver" (e.g., barcode detector) that could be considered include: localization of the barcode (e.g., where is the barcode likely to be within captured imagery), adaptive and continuous synchronization (e.g., providing updates to the synchronization based on decoding step results), adaptive channel estimation, maximum-likelihood channel decoding, and/or reliance on detection and estimation theory.)

During a localization sub-stage, imagery (e.g., video frames) are obtained, e.g., from a cellphone camera (e.g., an iPhone 6, or Samsung Galaxy) or Point of Sale (POS) scanner device. Spatial domain features can be extracted from the captured imagery, which may correspond to a barcode or not. The features can be used with supervised machine learning/training. A detection classifier can be determined to center in on a barcode within the captured imagery.

Once a barcode is isolated, additional training/classifiers can be used to help determine a likely orientation for the barcode, e.g., coarse synchronization. A bounding box can be generated to help define likely image areas corresponding to the barcode. The bounding box can be padded by a few (or more) pixels to help ensure that the entire barcode is isolated.

Fine synchronization, correlation and validation can be included sub-stages of the Decoding stage as shown in FIG. 11. A few of the features include, e.g., template correlation, path decoding to help determine symbol sequence, and a multi-scanline varication when combines results from multiple scanlines to help determine a barcode's code. Many other features and details are described within this patent document including MatLab Appendices.

Of course, the FIG. 11 overview is only but one example of the present technology. Other examples many include additional or fewer of the illustrated components. For example, and again with reference to FIG. 11, the Detection and Decoding stages need not operate together. In one implementation, the Decoding stage operates on scanline data provided to it, regardless of source. In another implementation, the Detection stage provides localized and perhaps bounded image data to a barcode decoder other than the FIG. 11 Decoding stage. In still another implementation, additional or fewer sub-stages are included.

Barcode Localization (Detection):

Introduction

The following technology employs machine learning (e.g., feature extraction, classification, etc.) to localize or detect barcodes and to determine an alignment angle of a localized barcode within imagery, particularly for operation on smart phones such as iPhones and Android devices, and POS scanners such as those found at retail checkout. Related and additional details are found in assignee's U.S. patent application Ser. No. 15/059,690, which is hereby incorporated herein by reference in its entirety. In the following example, machine learning is used for localization of a 1-dimensional (1D) UPC barcode within captured imagery. Of course, classifiers can be trained to localize other types of machine-readable indicia including other 1D barcodes and 2D barcodes (e.g., EAN8/EAN13, QR Codes, Datamatrix, PDF417, ITF, Code 39, Code 93, Code 128, MSI Plessey, GS1 Databar, GS1 QR Code, and Aztec, etc.) In fact, the following machine learning is applicable for localizing multiple different 1D barcodes including UPC-A, UPC-E, EAN-13, EAN-8, Code128, ITFR-14 and Code39.

Feature Set

One component of barcode localization includes an edge orientation sensitive feature set. Given a grayscale image (or image patch) X of dimensions M×N (M rows, N columns, both dimensions can be multiples of p∈N for simplicity), the feature set can be computed using the following process:

1. The image X can be downsampled by a factor of p using, e.g., nearest-neighbor downsampling (e.g., it can be faster to process an image with $p^2$ times less pixels) to X'. Other downsampling technology, e.g., bilinear, bicubic, etc. can be alternatively used.
2. Image X' can be convolved * (or, alternatively, cross correlated, dot product processed, etc.) with, e.g., 4 directional filters $F^V, F^H, F^D, F^M$ (vertical (V), horizontal (H), diagonal (D), minor diagonal (M))

$$F^V = \begin{pmatrix} 0 & 0 & 0 \\ 1 & -2 & 1 \\ 0 & 0 & 0 \end{pmatrix}, F^H = \begin{pmatrix} 0 & 1 & 0 \\ 0 & -2 & 1 \\ 0 & 1 & 0 \end{pmatrix}, F^D = \begin{pmatrix} 0 & 0 & 1 \\ 0 & -2 & 0 \\ 1 & 0 & 0 \end{pmatrix},$$

$$F^M = \begin{pmatrix} 1 & 0 & 0 \\ 0 & -2 & 0 \\ 0 & 0 & 1 \end{pmatrix}$$

to create 4 residual matrices:

$$Z^V = X'*F^V, Z^H = X'*F^H, Z^D = X'*F^D, Z^M = X'*F^M$$

3. Values in the residual matrices $Z^S$, $S \in \{V, H, M, D\}$ are quantized (e.g., divided or multiplied) by q, an integer, rounded and truncated so that the values of $R^S$ are in $\{-T, -T+1, \ldots T\}$. Formally, $$R_{i,j}^S = trunc_T\left(round\left(\frac{Z_{ij}^S}{q}\right)\right), \forall S \in \{V, H, M, D\},$$

$$\forall i \in \left\{1, \ldots, \frac{M}{p} - 2\right\}, \forall j \in \left\{1, \ldots, \frac{N}{p} - 2\right\},$$

where t, j are indexes of the matrices $Z^S$ and truncation is defined as $$trunc_T(k) = \begin{cases} T & \text{when } k \geq T \\ k & \text{when } -T < k < T \\ -T & \text{when } k \leq -T \end{cases}$$

4. For each coordinate $$i \in \left\{1, \ldots, \frac{M}{p} - 2\right\}, j \in \left\{1, \ldots, \frac{N}{p} - 2\right\},$$

values can be computed for index matrix:

$$I_{i,j} = 1 \cdot (R_{i,j}^V + T) + (2T + 1) \cdot (R_{i,j}^H + T) +$$
$$(2T + 1)^2 \cdot (R_{i,j}^D + T) + (2T + 1)^3 \cdot (R_{i,j}^M + T).$$

This index matrix now includes a unique number between 0 and $(2T+1)^4-1$ for each possible combination of quadruplet $(R_{i,j}^V, R_{i,j}^H, R_{i,j}^D, R_{i,j}^M)$. Given the nature of the following classifier, we can work directly on the index matrix.

5. Optionally, the final feature set obtained from the image X is the histogram of index matrix I divided by the number of elements in I. Formally, $$f(X) = \frac{hist_0^{(2T+1)^4-1}(I)}{\left(\frac{M}{p}-2\right)\cdot\left(\frac{N}{p}-2\right)},$$

and the dimensionality of f(X) is $(2T+1)^4$.

All the parameters, including the directional matrices or filters, can been empirically selected based on, e.g., testing errors, computational requirements, etc. Our current preferred parameter values include:

downscaling factor, e.g., p=8; or p=round($\sqrt{\text{image\_pixels}/512}$)

quantization step q=16 truncation threshold T=2

The dimensionality of the resulting feature set is $5^4$=625. A unique index for each of the combinations can be determined. There are all together $(2*T+1)^4=5^4=625$ combinations. A histogram can be generated of these 625 possible outcomes within the image area (e.g., an 8×8 image block). To generate an index for each histogram bin, let's denote the four dimensional vector as [r1, r2, r3, r4]. The index can be denoted, Index=$[(r1+T)*(5^0)]+[(r2+T)*(5^1)]+[(r3+T)*(5^2)]+[(r4+T)*(5^3)]$=r1+r2*5+r3*25+r4*125+312. Which will give you a unique index in [0, ... , 625] for each combination. Of course, other values and dimensionalities can be selected based, e.g., on acceptable error tolerance, computation requirements, etc.

Classification

We can use a probabilistic statistical classification model, e.g., logistic regression, as a classifier for machine-learning training. For a given vector w=$(w_1, \ldots, w_{625})$ and feature vector x=$(x_1, \ldots, x_{625})$ extracted from image X, x=f(X), the probability p(x) that the image from which the feature vector is extracted is a barcode image can be defined as:

$$p(x) = \frac{1}{1+e^{-w\cdot x^T}}, \quad w\cdot x^T = \sum_{i=1}^{625} w_i x_i$$

where, $w_i$ denotes an element of the trained feature vector and $x_i$ denotes the bin value in the histogram (number of 'indexes' with corresponding value within the 8×8 image block).

Figure 2:
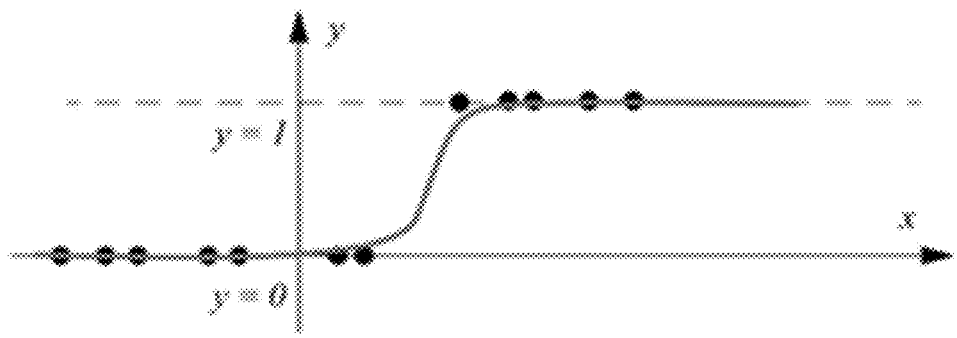
FIG. 2 shows an example of 1D logistic regressor.

Logistic regression can also be used as a linear binary classifier by saying that if p(x)>0.5 then the image is an image of a barcode. This condition corresponds to $w\cdot x^T + w_0 > 0$. The logistic function example for a one dimensional case for a given w can be seen in FIG. 2. We can say that images not containing barcode have label y=0 while barcode images are assigned a label of y=1. As a practical implementation note, and for barcode segmentation, the probability is not critical and the exponential function need not be computed. More interesting is finding the maximum probabilities, which relates, e.g., to finding the largest dot product $w\cdot x^T$.

In an alternative, where there is only 64 possible indexes, it might be inefficient to compute a histogram with 625 bins and doing 625 multiplications. So the 'indexes' can be used directly, adding a value of $w_i$ for each extracted 'index'. Formally, it can be written as $$w \cdot x^T = \sum_{j=1}^{s}\sum_{j=1}^{s} w_{index(i,j)}$$

This lowers the complexity and also allows us to use arbitrary dimensionality of the feature vector—the complexity is independent of dimensionality, there is no need for a '625' term.

Classifier Training

The vector w can be used for linear regression and can be determined by a training phase. In practice, for a given barcode format, training can be carried out once (or updated, if desired). The vector w determines an orientation of a decision boundary in feature space. In one implementation, training can be performed using an open source "libSVM" library downloadable at http://www.csie.ntu.edu.tw/~cjlin/libsvm/. Implementation details of the LIBSVM, including solving SVM ("Support Vector Machines") optimization problems, theoretical convergence, multiclass classification, probability estimates and parameter selection are detailed in Chang, C.-C. and Lin, C.-J. 2011, "LIBSVM: A library for support vector machines," ACM Trans. Intell. Syst. Technol. 2, 3, Article 27 (April 2011), 27 pages, which is hereby incorporated herein by reference in its entirety. In another implementation, the "LibLINEAR" open source library can be used for training. LibLINEAR is described, e.g., in i) R.-E. Fan; K.-W. Chang; C.-J. Hsieh; X.-R. Wang; C.-J. Lin, "LIBLINEAR: A library for large linear classification," Journal of Machine Learning Research 9: 1871-1874 (2008), and ii) Fan et al., "LIBLINEAR: A library for large linear classification," Journal of Machine Learning Research 9: 1871-1874 (2008) (as last modified: Aug. 23, 2014), which are each hereby incorporated herein by reference in their entirety.

Multiple Classifiers

In one implementation of our barcode localization technology, we preferably use staged classifiers to localize and then bound possible machine-readable indicia. For example, we can employ a general classifier to find potential barcode "hot spots" and then use orientation-specific classifiers to find a bounding box around such hot spots.

In one example of the staged classifiers a plurality of trained classifiers, e.g., 17 trained classifiers, operating on the same features—hence the features (e.g., index matrix) can be extracted once (and then updated, if desired). The first stage classifier (e.g., classifier 1 out of 17) can be trained to distinguish between content including barcodes (in arbitrary orientations) and content including no-barcodes. This first stage classifier can be used in a first step in barcode localization to determine high probability areas for barcode presence within a digital image. This first stage classifier is shown at stage 410 in FIG. 11. These high probability areas typically corresponds to at or around a barcode's center.

The second stage classifiers (e.g., the remaining 16 classifiers) can be trained and used to distinguish between different orientations of a barcode. This second stage classifier is shown at stage 412 in FIG. 11. In the 17 classifier example, after the first stage, the remaining 16 classifiers may correspond to angles 11.25, 22.5, . . . , 168.75 degrees.

Of course, additional or other angles can be used in other implementations, including using less or additional orientation classifiers. Once a barcode center is located, the remaining orientation classifiers may evaluate the center's neighborhood to decide which ones have the highest values (e.g., highest probability metrics).

Training of First Stage

The feature sets can be extracted from multiple images in two classes (first class: barcode, and second class: no-barcode) and they can be given to the classifier together with their class labels. The classifier then searches for optimal vector w that minimizes the square (if using so-called L2 criterion) of distance of the wrongly classified samples from the boundary, or simply to minimize the distance itself (if using so-called L1 criterion) from the wrongly classified samples from the boundary. Therefore, the training process 'trains' the vector w which then can be applied to predict whether an image contains a barcode or not for previously unseen samples.

Before training, the n-sample set of feature vectors z can be normalized to mean($x_i$)=0 and std($x_i$)=1, i∈(1, . . . , n). After the training, this normalization can be applied for each new testing sample. Alternatively, normalization can be applied to vector w to save runtime by precomputing it. Moreover, the whole model can be converted into integers, e.g., by multiplying by 32768.

Training Set for an Example Implementation

Multiple image samples were obtained from the internet and from assignee Digimarc Corp.'s own internal databases. From the obtained images, 1000 images including barcode areas and 500 images not including barcode areas were selected. Of course, we could increase or decrease the number of selected images in other implementations.

Barcode Orientation

Estimation of the barcode orientation can be structured as a multi-class problem. In one example implementation, orientation uses multiple classifiers, e.g., 16 classifiers, each trained to distinguish between one specific rotation and the rest (e.g., all other images including images with other barcode rotations+images with no barcodes). Each classifier represents one of the 16 angles: 0, 11.25, 22.5, 33.75, 45, . . . , 168.75 degrees.

A training set for one of the 16 angles α can be created in the following manner:

Barcodes rotated by angle α—Each of 1000 images including barcodes can be rotated to be in a horizontal position. Then, each barcode is randomly rotated by some offset, e.g., [α−5.625, α+5.625] degrees.

The other class—Mix of barcodes images and no-barcode images randomly rotated by any other angle than [α−5.625, α+5.625].

Barcode Localization

For barcode localization, the selected images were used to create a training set with 5000 images in both classes (1$^{st}$ class: barcode, and 2$^{nd}$ class: no-barcode):

Barcode class—312 or 313 rotated barcode images were randomly selected from each of the 16 barcode orientation databases. This yields a total of 5000 images, each image including a barcode.

No-barcode class—Each of 500 no-barcode images was ten (10) times randomly rotated between 0 and 360 degrees. This yields a total of 5000 images, each with no barcode.

From Features to Merged Heat Map—Single Heat Map Extraction for a Given Model

Figures 3A, 3B:
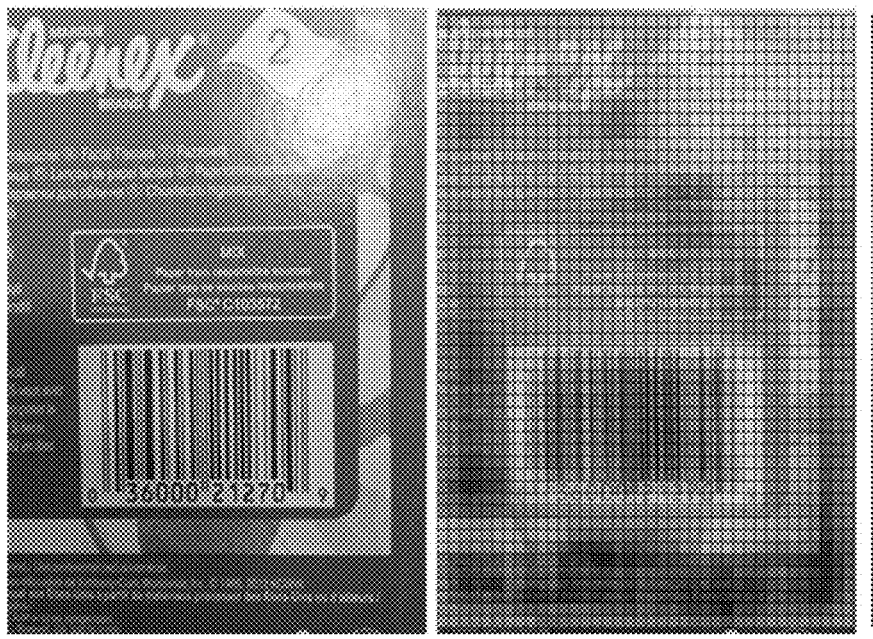
FIG. 3A shows an analyzed image captured with a cell phone camera.
FIG. 3B shows a heat-map representation of such analyzed image using averaged sub-block values V.
Figure 4:
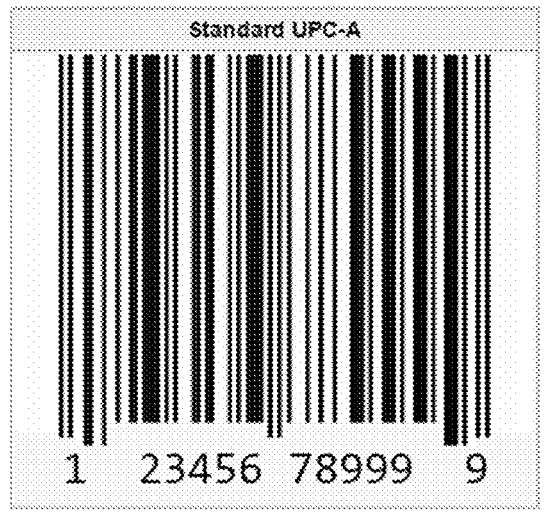
FIG. 4 is a diagram showing a standard UPC-A barcode.

An image to be analyzed, e.g., FIG. 3A can be divided into multiple non-overlapping square areas $S_{i,j}$ (sub-blocks), where i∈{1, . . . , $M_S$} and j∈(1, . . . , $N_S$) are the coordinates within the square grid. From each area, a feature vector $s_{ij}$=f($S_{i,j}$) can be extracted.

A model m can be used with a trained vector $w^{(m)}$. For each averaged sub-block feature vector s, we can compute the dot product $V_{i,j}^{(m)} = w^{(m)} \cdot s_{ij}^T$. In the resulting matrix $V_{i,j}^{(m)} \in \mathbb{R}^{M_S \times N_S}$, the higher the value the more probable is the presence of the barcode (depending on the used model, e.g., barcode present or not) in the location i,j.

For a practical implementation the feature vector need not be computed because the value of V(i,j) for a given classifier can be computed directly from the index matrix.

To improve robustness while preserving the sub-block spatial resolution, we can compute the sub-block average matrix V by averaging every value in element's k×k neighborhood. For simplicity, it can be assumed that k is an odd number. Formally, $$\bar{V}_{i,j} = \frac{1}{k^2} \sum_{u=i-\frac{k-1}{2}}^{u=i+\frac{k-1}{2}} \sum_{v=j-\frac{k-1}{2}}^{v=j+\frac{k-1}{2}} V_{u,v},$$

The visualized matrix $\bar{V}^{(m_i)}$ where the model $m_i$ is the barcode location model (not orientation) is shown in FIG. 3B In a preferred implementation, the size of each sub-block includes a down-sampling, e.g., 8×8 down-sampled values, and the averaging neighborhood can be a reduced set, e.g., 5×5 (k=5).

Obtaining a Merged Heat Map

First, the technique from above can be applied on the barcode location model me. This will result in a heat map, e.g., a graphical example of such is shown in FIG. 3B. The coordinate of the maximum value of this location heat map c∈{1, . . . , $M_S$}×{1, . . . , $N_S$} is treated as a barcode center. To determine the barcode rotation, the subset of index matrix around the center with size corresponding to 5×5 sub-blocks is extracted. This area should still mostly contain the barcode and this index subset is classified using the 16 rotation models. The orientation model with highest classification value corresponding to $\mathrm{argmax}_{m_i}(\bar{V}^{(m_i)})$ can be considered as a primary orientation (angle α), denoted $m_\alpha$.

Since an actual orientation might lie directly between two angles represented by one of the 16 models or the barcode orientation might change over the image, a secondary orientation angle can be added. The secondary orientation (angle β) is given as the larger of two neighbors of the primary orientation and it can be denoted $m_\beta$.

The weight of heat maps created from both orientation models, $r_\alpha$, can be determined by using a ratio, $$r_\alpha = \bar{V}_c^{(m_\alpha)} / \left( \bar{V}_c^{(m_\alpha)} + \bar{V}_c^{(m_\beta)} \right).$$

The merged heat map can be generated by merging a barcode location heat-map and a barcode orientation heat map. A constant t∈[0,1] determines the tradeoff between those two. Consequently, the values of the merged heat map H that is used to find a bounding box can be determined as:

$$H_{i,j} = (1-t)\bar{V}_{i,j}^{(m_l)} + t\left(r_\alpha \bar{V}_{i,j}^{(m_\alpha)} + (1-r_\alpha)\bar{V}_{i,j}^{(m_\beta)}\right)$$

where $i \in \{1, \ldots, M_S\}, j \in \{1, \ldots, N_S\}$. Currently, the weight of barcode orientation heat map t is set to 0.8. Of course, this weighting can be changed to achieve desired emphasis. Also, at this point, the estimated barcode orientation θ can be given as $\theta = r_\alpha + (1-r_\alpha)\beta$ From Merged Heat Map to Bounding Box This section describes a process for obtaining coordinates of four bounding box corners from the merged heat map H and the center coordinate c described above. This section corresponds to stage 414 in FIG. 11.

Step 1—Merged Heat Map Rotation Alignment

The matrix H is rotated by −θ degrees to create aligned matrix H'. The values are bilinearly interpolated. Moreover, we can also find a rotated center coordinate c', formally $c' = \text{rot}_{-\theta}(c)$.

Step 2—Bounding Box Initialization

Bounding box can be initialized as 1×1 neighborhood of the center $c' = (c'_{row}, c'_{col})$. In other words, top=floor($c'_{row}$), bottom=ceil($c'_{row}$), left=floor($c'_{col}$), right=ceil($c'_{col}$)

Step 3—Bounding Box Expansion Algorithm

Evaluate, e.g., 6 possible bounding box expansions (Matlab matrix coordinate notation):

Top by 1: $p_{e1}$=median(H'(top−1,left:rght))
Bottom by 1: $p_{b1}$=median(H'(bottom+1,left:right))
Left by 1: $p_{l1}$=median(H'(top:bottom,left−1))
Left by 2: $p_{l2}$=median(If(top:bottom,left−2))
Right by 1: $p_{r1}$=median(H'(top:bottom,rtght+1))
Right by 2: $p_{r2}$=median(H'(top:bottom,right+2))

Find the maximum from all $p_{}$ and if this maximum is higher than some threshold (currently 0), move the bounding box edge in the corresponding direction and by the corresponding shift (1 or 2). Then repeat the step 3. If the maximum of $p_{}$ is not higher than the threshold, then end the bounding box expansion. As an implementation note, the expansion to the left and right by 2 can be considered in order to jump over possible wide white spaces between barcode stripes.

Step 4—Invert the Rotation of the Bounding Box Coordinates

The resulting bounding box corner coordinates can be expressed as

Top-left: $\text{rot}_\theta$(top,left)
Bottom-left: $\text{rot}_\theta$(bottom,left)
Top-right: $\text{rot}_\theta$(top,right)
Bottom-right: $\text{rot}_\theta$(bottom,right)

In some cases, bounding boxes are generated for multiple areas (e.g., 2 or more areas likely to include a barcode). Two or more bounding boxes can be provided to the barcode decoder. The decoder can decide how to best process the two areas, e.g., splitting the number of scanlines between the two boxes (e.g., if 20 are available, each box only get 10 each) or processing the boxes sequentially or in parallel. Results from the boxes can be combined when generating an output ID (e.g., a GTIN number). In the above discussion we focused on localization of 1D barcodes. This technology can be readily applied to localization of 2D barcodes such as QR codes Currently, the feature set for 1D, as discussed above, focuses on:

Horizontal residual (quantized, truncated)
Vertical residual (quantized, truncated)
Diagonal residual (quantized, truncated)
Minor diagonal residual (quantized, truncated)
Two extra elements to the vector extracted at each pixel can be added to consider 2D barcodes. These two elements are preferably sensitive to edges in two directions simultaneously since 2D barcodes typically have edges in two directions and approximately the same amount of them. The two elements may include:

Value of multiplication between Horizontal residual and Vertical residual (before quantization and truncation), then quantized and truncated.
Value of multiplication between Diagonal residual and Minor diagonal residual (before quantization and truncation), then quantized and truncated.

Also, a threshold parameter of T=1 instead of T=2, can be used for a feature dimensionality of $(2*T)^6 = 3^6 = 729$.

Barcode Decoding:

Introduction

Figure 6:
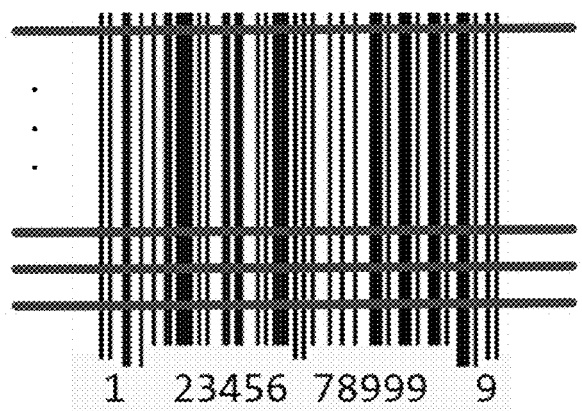
FIG. 6 is a diagram showing multiple scanlines across a UPC barcode.

Once a barcode is localized, it can be decoded, e.g., barcode symbols can be interpreted and/or deciphered. As mentioned above, a decoder need not have a localization module and can instead operate on various input scanlines. A generalized flow for barcode decoding may include:

Scanlines—Find the most likely string of digits (or elements representing a digit) represented by a set of scanlines (e.g., by looking at 3-20 scanlines across a UPC barcode as in FIG. 6, or across one or more bounding boxes identified by localization). As used in this disclosure, a "scanline" represents a stripe or row of image data. A scanline's height may correspond to 1 or more pixels. In some cases, a scanline represents a waveform as shown in FIG. 7B.

Optionally, validate that this string of digits corresponds to a legitimate 1D barcode, e.g., for a UPC-A see if the expected 84 modules or 12 digits are present.

Divide decoding of a scanline string into two procedures—synchronization and decoding (or correlation).

Synchronization may determine, e.g., scale and translation of the barcode, as well as 180 degree orientation (e.g., reading Left2Right (L2R) or Right2Left (R2L)).

A matched filter approach can be used for obtaining scale and offset of the Start (S), Middle (M) & End (E) sync bars.

This sync procedure may also indicate whether a scanline is blurry.

Sync may also determine whether nonlinearities should be used in the decoding process.

Synchronization can be configured to provide the first 3 digits of a barcode, metrics and estimated position of next digit.

Decoding

Determine which digit out of ten possibilities (i.e., 0-9) the next digit corresponds to.

Uses correlation-based metrics, which adapt to match an estimated scale.

Blur and nonlinearity can be compensated for during this procedure.

A path decoder can be used to decode digit blocks, e.g., 3 digits at a time. The Path decoder may use, e.g., dynamic programming (e.g., Viterbi decoding), to determine the most likely corresponding digits.

Validation can be used to determine the most likely decoded digit from the results of path decoder for a set of combined scanlines, and also applies the checksum. Misread mitigation can also be used to help produce quality results.

A more detailed description follows. With reference to FIG. 6, and given a series of scanlines, it is an objective of a barcode decoder to find the most likely string of digits represented by the scanlines and to validate that this resulting string corresponds to a legitimate barcode ID. A barcode decoder can be configured to return a valid barcode ID (e.g., a GTIN ID), or a null string if no valid barcode ID is found. In other implementations, the decoder may return a barcode ID with an indication that the ID may not be reliable, or not display any information when the barcode ID is uncertain or untrustworthy. As discussed above and with reference to FIG. 11, barcode decoding 420 can be divided into three primary stages or procedures: synchronization 422, correlation or scanline decoding 424 and barcode ID validation 426.

Barcode Synchronization

An objective of synchronization is to determine a scanline scale and translation so that symbols (e.g., representing data digits and S, M and E) can be properly extracted. Captured barcode images often have non-trivial scale changes along a scanline (e.g., from left to right). In fact, a determination can be made as to whether a scanline is oriented at 0 or 180 degrees (e.g., forward or backwards reading). Often, an initial scale estimate can be adapted during decoding (or correlation) as the digits are progressively recovered along a scanline.

Before we get too far ahead of ourselves, let's spend some time talking about our preferred digit templates. Generally, each template represents one unique bar (b) and space (s) pattern corresponding to a symbol or digit between 0-9, e.g., representing the bar ("1") and space ("0") symbol element patterns as shown in Table 1. In this context, an "element" represents a "0" or "1" and a pattern of elements represents a symbol or digit.

TABLE 1

Bit Patterns for Left and Right side UPC codes

| SYMBOL VALUE | L-CODE REP. | R-CODE REP. |
|---|---|---|
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

A template may include a binary bit pattern corresponding to a symbol. In other cases, a template represents a waveform corresponding to a pattern of lines and spaces representing a symbol between 0-9. Templates can be stored by compressing their values to reduce storage. (If a family of blurred templates are produced, each representing a digit at a different blur level, then the template family can be compressed by using the fact that same template is correlated between different blurs.)

In one implementation, the process of templates construction begins with the commonly understood definitions of each possible symbol in an EAN barcode. There are two basic types of binary-valued symbols, synchronization symbols and data-carrying symbols. The synchronization symbols have two different lengths and the data-carrying symbols are seven elements long. See Table 2 for symbol definition details. In Table 2, the element representation of each symbol has been inverted relative to Table 1. We do this here since a scanline represents a greyscale values ranging from white (255 greyscale value) to black (0 greyscale value). So in Table 2, the binary representation physically corresponds to a space for elements set to "1" and a bar for elements set to "0". The included MatLab appendices adopt this symbol representation.

TABLE 2 shows symbol definition details for an EAN barcode (inverted)

| SYMBOL VALUE | SYMBOL REPRESENTATION | SYMBOL TYPE |
|---|---|---|
| End Synch | 1 1 1 0 1 0 1 | Synch |
| Mid Synch | 1 0 1 01 | Synch |
| 0 | 0 0 0 1 1 0 1 | Data |
| 1 | 0 0 1 1 0 0 1 | Data |
| 2 | 0 0 1 0 0 1 1 | Data |
| 3 | 0 1 1 1 1 0 1 | Data |
| 4 | 0 1 0 0 0 1 1 | Data |
| 5 | 0 1 1 0 0 0 1 | Data |
| 6 | 0 1 0 1 1 1 1 | Data |
| 7 | 0 1 1 1 0 1 1 | Data |
| 8 | 0 1 1 0 1 1 1 | Data |
| 9 | 0 0 0 1 0 1 1 | Data |

In Table 2, the End Synch symbol departs from common notation in that there the binary string "0 1 0 1" is preceded by the string "1 1 1," which is a portion of the so-called "Quiet region." The reason for the concatenation is that it is useful to fold the quiet region into template construction due to its value in improving synchronization efficacy. The (inverted) symbols in Table 2 correspond to the symbol alphabet of symbols in location 7 through 12 (right side) in a UPC-A barcode. The symbol alphabet of symbols in locations 1-6 is obtained by taking the bitwise negation of the Table 2 data symbols.

Figure 15:
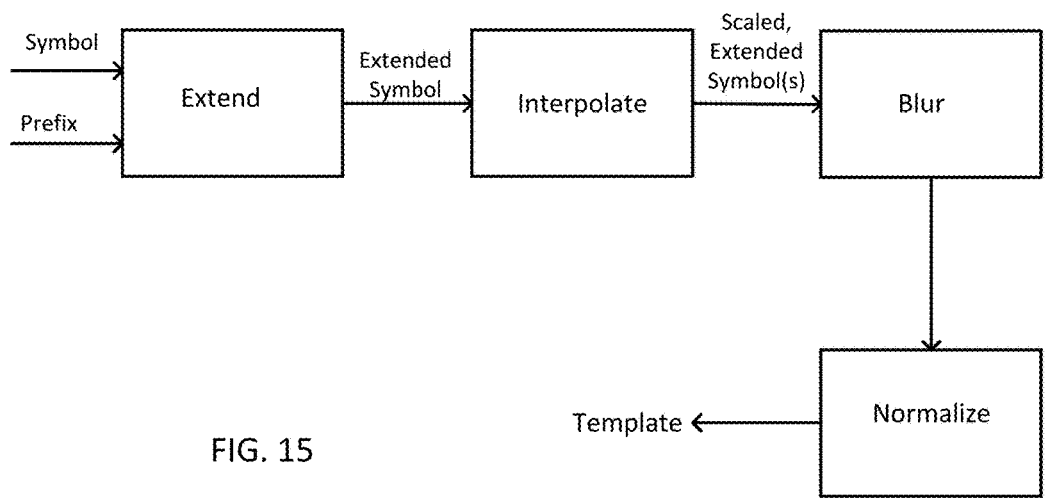
FIG. 15 is a block diagram for template creation.

Using the symbol representations of Table 2, templates can be created according to a sequence of operations shown in FIG. 15.

FIG. 15 shows a block diagram for template creation. The two inputs to the block diagram are "Symbol," e.g., one of the twelve (12) binary strings in Table 2, and "prefix," a binary string of length, e.g., three (3). The block labeled "Extend" creates an extended symbol by prepending the 3-bit prefix to "Symbol." A purpose of symbol extension is to include the last section of any symbol that precedes the symbol of interest (during decoding) to help with misread mitigation. In Table 2, a previous symbol always ends with "1"; so the prefix does not include the last element of the previous symbol (the "1"). Instead, the prefix includes the next three binary elements. For example, if the previous symbol was decoded as a "4," the prefix for the next symbol would include elements: 0 0 1. Similarly, if the previously symbol was decoded as a 6, the prefix would include elements: 1 1 1. As a last example, if the preceding symbol was an End Sync, the prefix for the next symbol would be: 0 1 0.

Figure 5A:
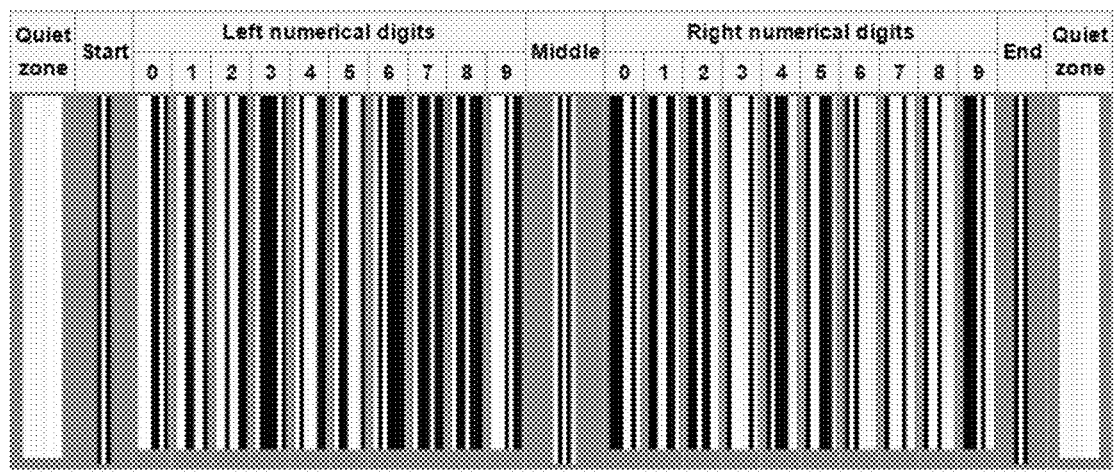
FIG. 5A is a diagram showing the encoding format for the FIG. 4 barcode.
Figure 5B:
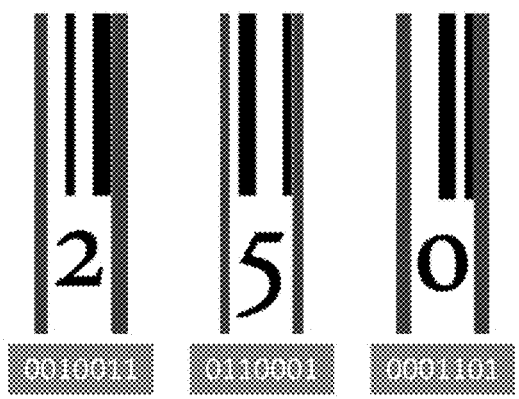
FIG. 5B is a diagram showing left side bit encoding for a few digits.
Figure 5C:
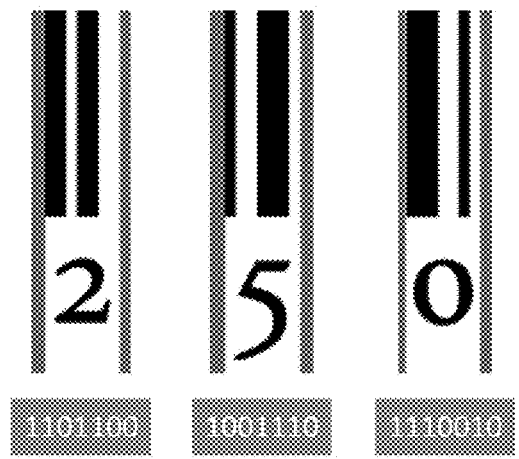
FIG. 5C is a diagram showing right side bit encoding for a few digits.
Figure 5D:
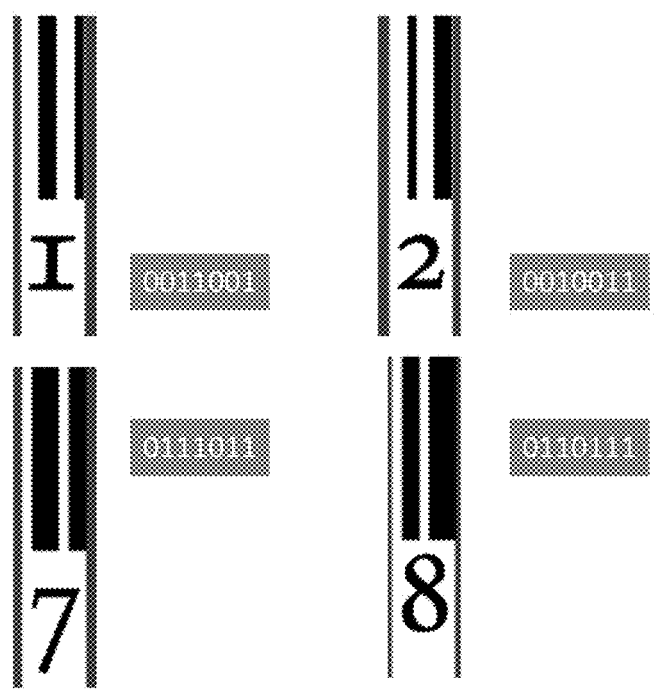
FIG. 5D is a diagram showing similar patterns between 1's and 7's, and 2's and 8's.

The Extend operation creates an overlapping template, which represents a current symbol, and a portion of a previous symbol. While we have used a 3-bit prefix, we can use additional preceding elements (e.g., 4-bits or more) in other implementations. Overlapping templates can be particularly helpful for some UPC digits having similar patterns relative to other UPC digits. For example, and with reference to FIG. 5D, 1's and 7's have a similar pattern (e.g., a left side 7 is just a fatter version of 1), and 2's and 8's have a similar pattern (e.g., a left side 8 is a fatter version of 2). A potential misread can occur when considering these digits (1 vs. 7, and 2 vs. 8). In one implementation, an extended template is only used when a barcode decoder suspects that a decoded symbol includes a potentially troublesome symbol (e.g., 1, 2, 7 or 8). In other cases, an extended template is always used, regardless of the particular digit.

The operation labeled "Interpolate" is tasked with resampling an extended symbol to a multiple (e.g., a scale factor) of an original symbol length using linear interpolation. A purpose of creating templates that cover a range of scale is to match each baseline "module" (one bar element or one space element) of a given scanline to an appropriate template. Currently, the interpolation multipliers, or template scales, range between two and six times the original extended symbol length. Of course, we could use more or less scaling depending on various operation factors, e.g., processing time required, processing capabilities, memory constraints, etc.

After interpolation, the result can be modified, e.g., blurred or filtered. For example, blurring can be achieved by using various symmetric blur kernels (shown in Table 3).

TABLE 3

Blur kernels used to create Blurred Templates

| FILTER TYPE | $TAP_{-3}$ | $TAP_{-2}$ | $TAP_{-1}$ | $TAP_0$ | $TAP_1$ | $TAP_2$ | $TAP_3$ |
|---|---|---|---|---|---|---|---|
| No Blur | 0 | 0 | 0 | 1 | 0 | 0 | 0 |
| Moderate blur | 0 | .0856 | .247 | .343 | .247 | .0856 | 0 |
| Severe blur | .0702 | .1311 | .1907 | .2161 | .1907 | .1311 | .0702 |

As with Interpolation, blurring can be used to create templates that cover a variety of blur conditions observed in different scanlines. The above example three kernels handle cases of moderate and severe blur, as well as no blur. Since the blur kernels are fixed, relative blur for templates with higher scale is less than that of templates with smaller scale.

Finally, normalization can be performed on the templates because they are used to calculate correlation coefficients. In other words, the normalization that the correlation coefficient computation uses can be performed ahead of time. Normalization means that the templates have their mean removed and are divided by (L−1) times their standard deviation, where L is the interpolated template length.

Templates can be constructed for various scales as mentioned above. In one example, templates can be constructed to include a scale between 1.875 and 4.375 in linear increments of 0.05. In this example, a total of 53 scales result for each symbol. For each symbol (except end-synch) there are also eight possible 3-bit prefixes. At each scale three different templates (no blur, moderate blur, and severe blur) can be computed per symbol.

Since there are a total of twelve different symbols, including synch, the number of symbols per scale is 36. Putting this all together, the total number of templates is as follows:

totalTemplates=numScales*numTempTypes*(numPrefixes*(SymbAlphabetSize+1)+1)=16695

In the above equation, (SymbolAlphabetSize+1) accounts for use of the midSynch symbol and the "+1" after this quantity is for the endSynch symbol, which in this equation does not use a prefix. With a typical template size of 10 units and an average scale of 3.0, this requires, e.g., about 500 KB of storage, assuming the templates are stored as bytes.

The templates can be compressed prior to storage to reduce required code size. Also, during a software program operation, the templates can be stored as interleaved waveforms to make the software program implementation efficient.

Now let's get back to Decoding 420 (FIG. 11). A scanline element may include the scanline data itself and rough estimates of where the digit data starts and ends, relative to the beginning and ending of the scanline itself. Unlike other barcode decoders, the scanline data need not be binarized. One example synchronization operation 422 may proceed as follows:

1. Decide upon a reading orientation, left to right (L2R) or right to left (R2L). The parity of the L and R sides can be considered in this evaluation.
    a. If reading R2L, the scanline can be flipped back to L2R and an internal flag is set.
2. Establish a set of candidate positions for translation or offset parameters.
    a. Starting at the beginning of a scanline and look for relatively large differences between samples in close-proximity to one another. The first large difference observed likely corresponds to the end-synch pattern (e.g., a transition from the quiet zone to the Start bars), but other large differences can be stored as candidates beyond the first one observed. If the position corresponding to the first large difference does not lead to a verifiable starting point, other possible candidates can be evaluated.
3. Determine scale and offset of Start and End synch patterns for a current candidate starting position. One or more matched filtering operations can be used to determine the scale and offset. A determined scale can be used as an initial estimate for the process.
4. Verify that position and scale are acceptable estimates and establish other parameters for decoding the scanline:
    a. E.g., decode the first three digits using various different orientation estimates and examine output metrics to determine which parameters should work best for decoding the remaining digits. Output metrics may include, e.g., correlation coefficients relative to expected digit templates.
    b. Estimated parameters may include:
        i. Whether a scanline is oriented at 0 or 180 degrees.
        ii. If the scanline seems blurry or not.
        iii. Whether a non-linearity should be applied during the decoding process to better match the observed data.

Output of this synchronization process may include an approximate position for the start of next digit to be decoded (e.g., the $4^{th}$ out of 12 digit), estimated scanline scale, and the first three digits and corresponding metrics. The metrics may include a correlation coefficient between digit templates (e.g., known patterns of space and bars corresponding to digits to be decoded, like 0-9) and data corresponding to the first three barcode digits.

The above synchronization procedure may be applied to each scanline independently. However, since each scanline does not contain independent data relative to the other scanlines, treating scanlines as independent can be inefficient and may result in robustness loss. Scanline data can be combined, averaged or normalized and then analyzed.

Scanline Decoding (or Correlation)

The scanline decoding or correlation process 424 may operate on individual scanlines after synchronization and associated parameters are estimated. (As discussed within this patent document, however, the decoding may alternatively act on data representing 2 or more scanlines.) Scanline decoding may operate in one of two modes: adaptive, in which the underlying scale estimate is allowed to change during the decoding process, and non-adaptive, in which the scale estimate is fixed after it is estimated during synchronization. Both modes can be employed in succession. Characteristics of any given captured barcode may determine which of the two modes is more effective for a specific case. Inputs for scanline decoding preferably includes an approximate start position of a next digit to be decoded (e.g., $4^{th}$ out of 12 digit) and the (estimated) scanline scale.

Decoding a Single Digit

The process of digit decoding amounts to determining which digit out of ten possibilities is most likely. For example, each digit 0-9 is represented by a unique pattern of bars and spaces. A correlation coefficient can be used to determine the most likely digit, where the correlation is between the scanline data starting at the expected digit position and a set of digit templates that are scaled to match the estimated scale of the scanline (at the current position). In addition to scaling the set of templates, it is also possible that the templates are blurred and/or have a non-linearity applied to them, if the captured data warrants this, as measured or determined during the synchronization step.

Path Decoder

A so-called "Path Decoder" (PD) can be used to decode 2 or more blocks at a time (preferably 3 blocks at a time). Each PD step may follow the procedure described in "Decoding a Single Digit," above, with the complication that the offset between adjacent digits can change according to rules of the PD. The PD preferably uses principles of dynamic programming to decide upon which sequence of three digits is most likely (e.g., a "best path"). In one implementation the dynamic programming is configured as a Viterbi decoder to decide upon the best path sequence of the next, e.g., three barcode digits. During the decoding of a digit the scale is preferably fixed, but the offset between adjacent digits can vary according to a predetermined set of rules. These rules may enable the path decoder to track gradual changes in the underlying synchronization parameters across a scanline. The "best path" can be defined as the one that has the largest correlation coefficient on average with the matching digit templates. For a UPC-A barcode there are four blocks of three digits (i.e., 12 digits total) each using this construct. The UPC-A barcode includes synch digits and digit blocks: End-Synch, Block1, Block2, Mid-synch, Block3, Block4, End-synch.

Scale Refinement

In adaptive mode the estimated scale of the scanline can be updated while decoding a BlockN with the PD (N being an integer 1-4). A trial scale estimate is obtained by applying a small change to the current scale estimate. The trial scale estimate is used to decode the same block of digits that was decoded using the original scale estimate. If the trial scale estimate leads to a higher path metric (in the dynamic programming) than the path for the original scale estimate, the trial scale estimate replaces the original estimate. Note that the scale estimate is preferably constant from digit to digit while decoding within a digit block.

Overall Decoding Procedure

Decode $2^{nd}$ block of three digits using the PD. At this point, synchronization has produced estimates for digits in the $1^{st}$ block (including 3 digits) relative to know templates, which can be used as a starting point for the $2^{nd}$ block (also including 3 digits). Correlation with the mid-synch can be used to update offset for decoding the next digit block (block3). The $3^{rd}$ block of digits can be decoded using the PD, as can the $4^{th}$ block.

The output of the PD provides an estimated set of twelve digits and associated metrics (e.g., correlation coefficients indicating correlations between different digit templates). The output may also include a valid decode flag (e.g., yes or no).

Digit templates for digits 0-9 can be pre-computed and stored for a series different scales and/or applied blurs. In an alternative implementation, a single template per digit is precomputed and stored at a predetermined scale and then can be nearest-neighbor downsampled for any specific different target scale. Different blurring kernels can be applied to the templates to estimate blurring. That is, a template can be blurred instead of cleaning up or filtering scan data (or image data). If a higher correlation metric is obtained from a particular blurred template, an inference that the incoming image data/scanline was blurred can be made. Correlating metric results can be used to estimate a likely amount or type of blur. In some cases the Decoder may consider the end-synch after last digit block to aid in decoding. Doing so may help the Decoder decide upon the correct digit path and/or aid in verification that the end of the data sequence has been reached. Currently, a R2L decoding of a scanline is independent from L2R decoding. However, an improvement may include sharing information between the two decoding directions to improve robustness.

Early Exit

If at any point during the decoding procedure the correlation coefficient with the best candidate digit falls below a certain threshold, decoding of the scanline can be aborted. Here are a few reasons that this can happen:

The scanline is not from a barcode (e.g., a Localization and Detection false positive);

There is an erasure in the scanline due to lighting, printing errors, print head failure, smudging, etc.; and/or The PD fails to sufficiently track changes in the scanline, which can happen, for example, if the scale changes rapidly.

If an early exit condition occurs, an invalid decode flag can be set.

High SNR, Rapid Scale Change Decoder

When a barcode scanline is characterized by rapid changes in scale but is otherwise largely free of noise and distortion, employing the PD can be a non-optimal approach decoding the scanline. For this reason, we have implemented an alternative decoder that updates the scale when decoding each of the twelve integer digits and the mid-synch digit. This alternative decoding technology can be configured as follows:

1. Provide an estimate of position and scale for a current digit, decode data digit at the estimated position and in a neighborhood of surrounding position offsets.
    a. For the case of the first digit, parameter estimates are obtained from synchronization.
    b. For the case of ensuing digits, parameter estimates are obtained from decoding the previous digit.
2. Find an offset in a neighborhood of the position estimate that leads to the highest metric.

3. Use the offset value to adjust the current scale estimate. If the offset is greater/less than the position estimate the scale estimate is increased/decreased using the following equation:

a. NewScale=(symbLen*scale+(offset−posEst))/symbLen

This step leverages the ability to track scale via correlation when the assumed scale is a bit off from the true scale value. If the scale were perfect, the correlation offset should match the estimate of position (posEst). If the underlying scale is greater than the assumed scale, offset will be a little larger than position estimate, which causes "NewScale" to increase relative to "scale." The opposite occurs when offset is smaller than position estimate. The other variable (symbLen) ties into posEst through the following equation: posEst=oldPos+symbLen*scale. Thus, it is seen that "offset" is dependent upon both "symbLen" and "scale" when scale differs from the true scale.

4. Set the position estimate to the offset value found in step 2; i.e. newPos=offset
5. Using the new scale estimate, decode the digit again (e.g., using the techniques discussed above). Record its value and associated correlation metric
   a. Note: It is expected that the digit value after adjusting the scale is the same that was observed using the initial scale estimate because of the high SNR. This assumption can be checked and, if invalid, may be an indication of tracking failure.
6. Using the new position and scale estimates, compute the starting position for the next digit.
   a. Next digit start=round(newPos+newScale*symbLen)
7. Return to step one to decode next digit, etc. Continue in this fashion to decode all twelve digits and one mid-synch symbol.
   a. After decoding the first six digits, the mid-synch symbol is reached. This symbol can be treated the same way as the digits with the following exceptions:
      i. The mid-synch symbol is slightly shorter than the data digits;
      ii. There is only one possible mid-synch symbol, as opposed to ten possible digits.

This decoder is not meant as a replacement for the PD but instead as an alternative that can be used when the PD metrics indicate that decoding of a scanline has likely failed. In some cases we may run both the PD and the dynamic decoder and compare results.

Barcode ID Validation

Estimate digit and metrics for each scanline decoded in four different ways or modes, including:
1. L2R, non-adaptive
2. L2R, adaptive
3. R2L, non-adaptive
4. R2L, adaptive Validation Procedure Decoded values can be validated 426 prior to outputting a code, if at all.

Results for all decoded scanlines can be grouped by mode. For example, the first group contains the results for all scanlines decoded L2R using non-adaptive scale. For a given group, a score is assigned based upon how many times the most consistent set of decoded digits is observed.

One validation implementation proceeds as follows:
1. Decoded digits from scanlines that do not have all their correlation metrics above threshold (e.g., 0.75 on a scale of 1.0-0.0) are removed from the group. If none of the scanlines produce decoded results that are entirely above threshold, the score is zero and we exit the routine.
2. Remaining decode results are sorted by average metric.
3. Starting with the case that produced the highest metric, we assign a score that is determined by how many of the other qualifying scanlines exactly match the current scanline's digits.
4. After a score is assigned the contributing decoded scanlines are removed from the group so that they are only counted once.
5. We continue to the next unique set of decoded digits, and repeat steps 3 and 4 until there are no remaining contributions.
6. We keep the highest score for the group and the associated set of digits. (Alternatively, we can keep 2 or more of the highest scores for evaluation.)

Scores are obtained for the other three groups in a similar fashion to the way they are for the first group. The procedure keeps the digits of the group that has the highest score and then applies the checksum. If the checksum is passed, the decoded digits are output and the "decode valid" flag to can be set to "true". Otherwise, the decoded digits are set to a null string and set the "decode valid" flag can be set to false.

For even greater robustness, the various group information can be combined and then evaluated. In other implementations, a weighting system applies a relatively higher weight to a scanline having a high and consistent correlation metrics versus a scanline having a lower confidence metric.

Appendix_A.txt, which is hereby incorporated herein by reference, includes MatLab code corresponding to some of the technology described above (e.g., UPC-C decoder). As will all the computer program appendices, the code is organized according to function or file name, e.g., "% file decodeBarcodeMainV2b" or "% file findBestPathsForSymbolBlock_storedTversion" and not necessarily according to overall code execution flow. Appendix_C.txt, which is hereby incorporated herein by reference in its entirety, also include MatLab code, which corresponds to decoding a so-called Code39 code, and which is organized according to function name and not necessarily according to overall code execution flow. Of course, the technology disclosed in the Appendices are applicable to other types of barcode decoding beyond UPC-A and Code39.

Alternative Decoding Procedure

An alternative barcode decoder may be configured as such:
1. Convert color image data into grayscale data (e.g., Yuv).
2. Binarize grayscale image data.
3. Across the binarized image data, process image rows with run-length encoding. For example, this views the image rows as a sequence of binary 1's and 0's.
4. Localize the barcode based on run length values. For example, looking for binary patterns corresponding to the quiet spaces and start or end patterns. A low standard deviation may help determine whether the sync codes have been located.
5. Step through groups of 4 integers on a scanline through the localized barcode. Run a correlation with expected templates 0-9.
6. Checksum verification.

Misread Recognition or Mitigation

A major concern with barcode detection is obtaining a "misread." A misread occurs when a barcode detector obtains a positive read, but one that includes the wrong numerical string. In other words, a misread incorrectly interprets a barcode's ID as some other number. Misread recognition can be integrated as a part of the validation operations 426.

We preferably employ at least two (2) misread recognizers to filter and/or minimize misreads. The first misread recognizer minimizes UPC-A misreads, that is, a UPC-A code is present but is interpreted incorrectly; and the second recognizer minimizes occurrence of other 1D barcodes (e.g., UPC-E, EAN-8, EAN-13, etc.) from being interpreted as a valid UPC-A code.

The first recognizer may utilize one of two components (or both): i) a blurriness metric, and ii) a consistency metric representing interpreted decoded IDs.

Figure 7A:
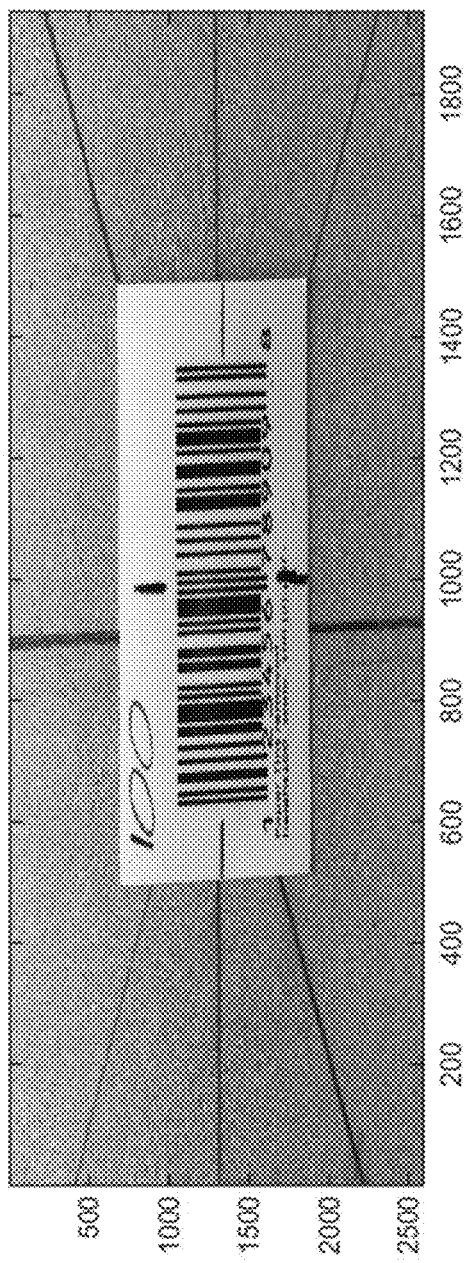
FIG. 7A is an image showing a UPC-A barcode.
Figure 7B:
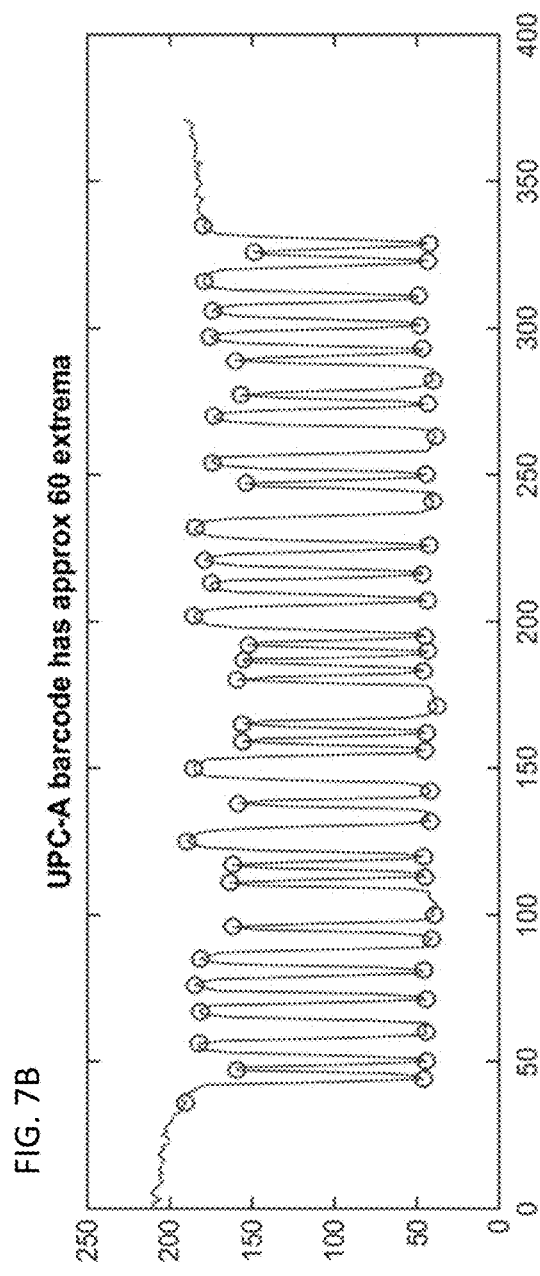
FIG. 7B is a diagram corresponding to a scanline across a bounding box representing the barcode shown in FIG. 7A.
Figure 8:
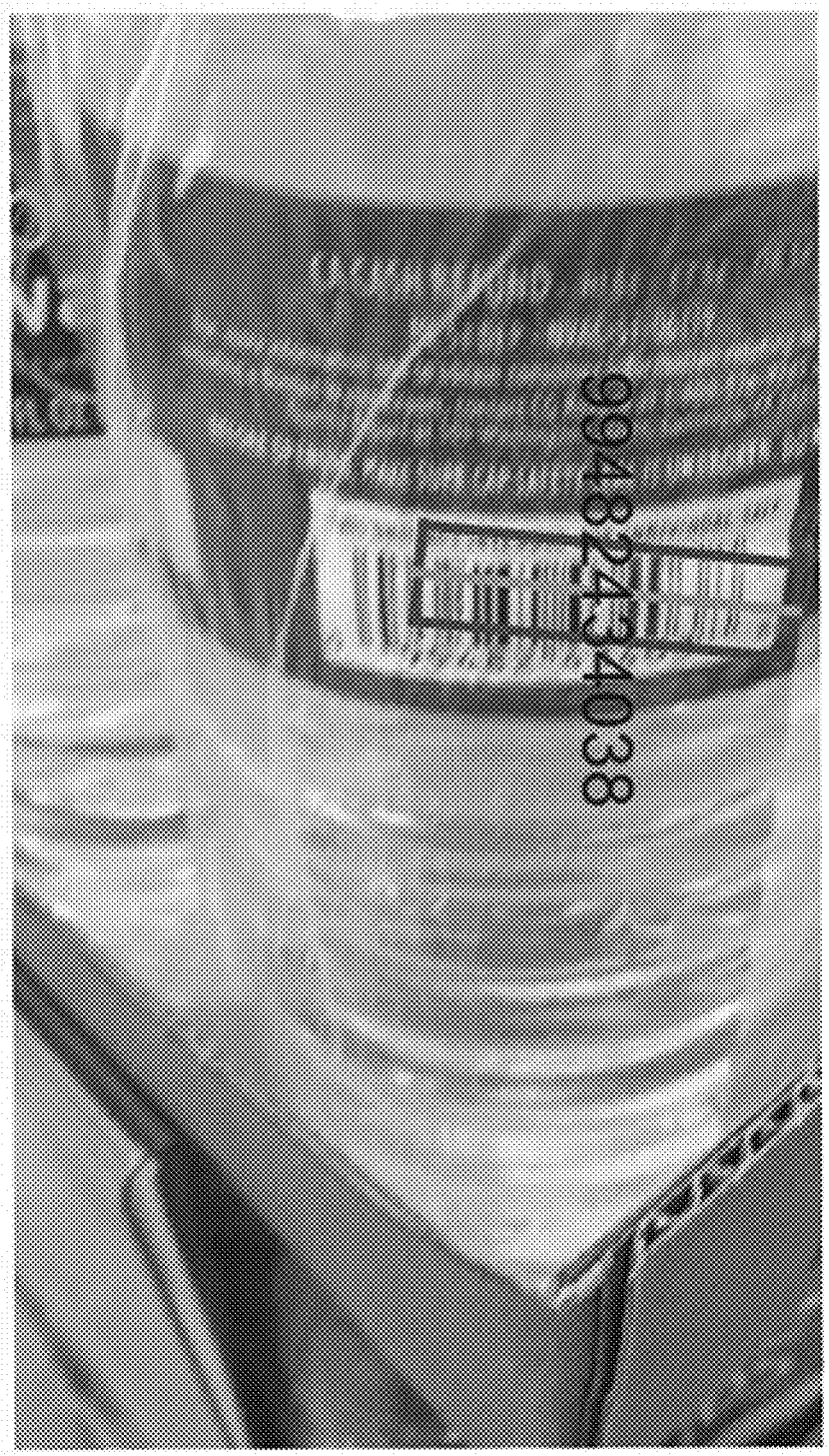
FIG. 8 shows a bounding box over a portion of a UPC-A barcode; padding the bounding box with extra pixel values helps ensure valid reads.

Referring back to the bounding box discussion in the barcode localization section, and now with reference to FIG. 7B, a waveform can be generated based on scanline data from within a bounding box (e.g., around the barcode of FIG. 7A). For example, after the barcode localizer finds bounding box coordinates, the image data within the box can be de-rotated and rescaled so that its width spans approximately, e.g., 300 pixels, which is about 3 times minimum resolution to read a barcode. A 2-D linear interpolator can be used to obtain the resampled image data. There can be some additional padding (e.g., additional pixels) added to the start and finish of the bounding box in case the detector does not lock on to the start of the barcode precisely. The extra bounding is shown from samples 0-40 (x-axis) and 340-380 in FIG. 7B. Additional padding can be added, e.g., 60 or so samples, on both sides of the box which gives about 380+ 60×2=500 samples per scanline. This padding helps in cases where localization may miss a portion of a barcode due to glare or shadows or some other reasons. With padding, the scanline information still has all the barcode data. For example, please see FIG. 8 where the bounding box (without padding) would not encapsulate the entire barcode.

Returning to the blurriness metric, and FIG. 7B, the average absolute diff between consecutive sample values can be used as a metric for image blurriness: Average $|p_i - p_{i+1}|$, where p is the sample value and i is an integer that can be incremented (or decremented) to run through all (or a subset of the) sample values. We have found that a blurry image has a lower average distance between consecutive samples (e.g., consecutive pixel values). So, determining an average value and then comparing against a predetermined threshold can be used as an initial filter to reject scanlines. This blurriness can be used on all scanlines, or a set of scanlines from a particular bounding box. A further metric looks at the pass rate for all scanline from a particular bounding box (e.g., 10-20 scanlines) and if a certain number fails (or passes) then the box can be rejected or accepted.

The second component of the first recognizer includes a consistency metric representing interpreted decoded IDs (sometimes called an output metric). The consistency metric can be determined by analyzing decoded numbers output by different scanlines within a bounding box. Say, e.g., that there are 10 scanline taken from within a bounding box. The scanlines are analyzed corresponding numbers decoded. Four different numbers (e.g., 4 unique GTIN numbers) are found in the 10 scanlines with the following frequency:

| Decoded GTIN Value | Occurrence |
|---|---|
| GTIN1 | 4 |
| GTIN2 | 3 |
| GTIN3 | 1 |
| GTIN4 | 2 |

The highest occurrence (e.g., mode) is GTIN1 with 4 votes or occurrences. GTIN1 is the highest confidence result with a confidence rate of 40%. The "40% confidence rate" can be compared to a threshold to determine whether this is an acceptable result. For example, if the confidence rate requires a 70% rate or higher, the scanlines from this bounding box would not pass. (E.g., the barcode reader can be configured to not provide a successful read if the confidence rate is below the threshold for acceptance.)

Figure 9:
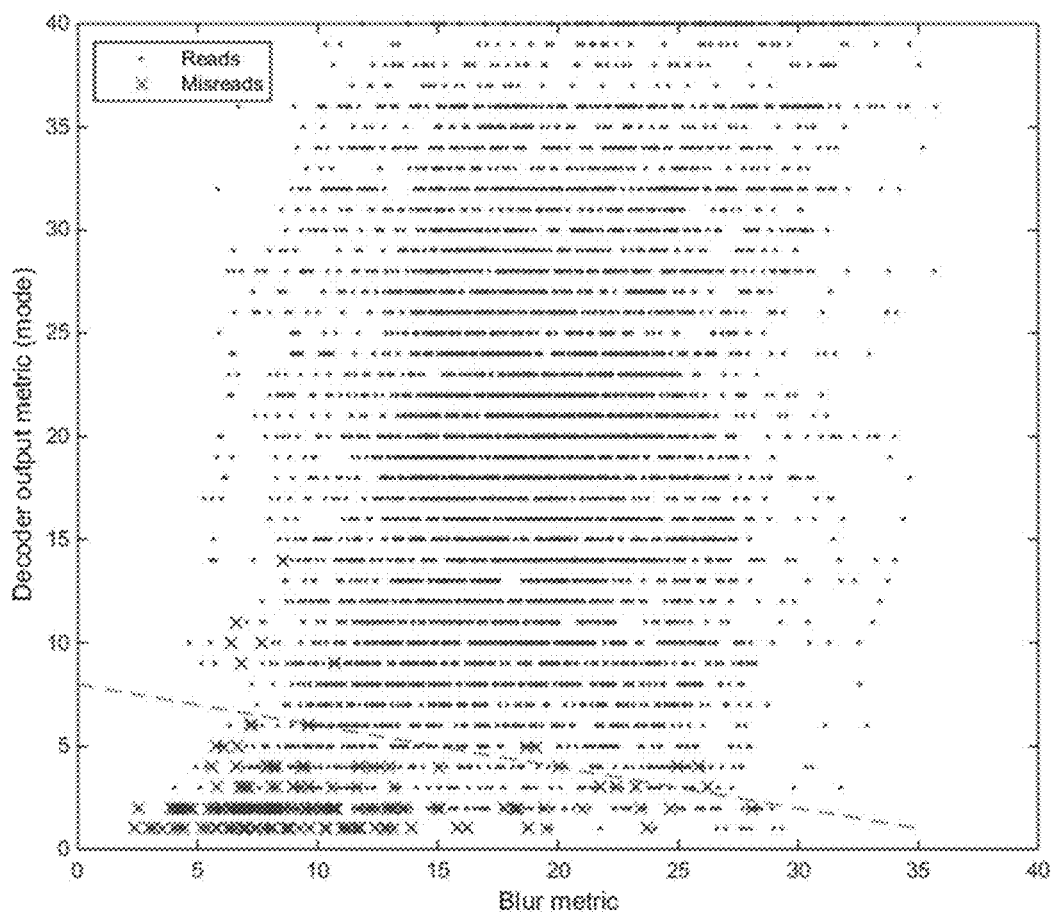
FIG. 9 is a diagram showing a threshold for two metrics in a first misread recognizer.

With reference to FIG. 9, the first recognizer can be configured to combine both the blur metric and the decoder output metric. The dashed line (negative slope) represent a threshold to combine both the blur metric and the decoder output metric. Any decoded ID value falling below the line is filtered out as having too low of confidence. Any decoded ID value appearing above the dashed line is considered trustworthy, and a decoded value can be output. Data from a set of actual barcode images is represented in FIG. 9. The X's represent misreads, and the dots represent accurate reads. Here the threshold is set to filter out most of the misreads, while sacrificing some actual reads. The threshold line could be adjusted, however, to filter even more or less of the misreads, depending on application tolerance for accuracy. Note that the horizontal scale in FIG. 9 corresponds to the vertical scale in FIG. 7B.

On to the second recognizer, which minimizes occurrence of other 1D barcodes (e.g., UPC-E, EAN-8, EAN-13, etc.) from being interpreted as a valid UPC-A code.

The second recognizer also may involve two metrics: i) a transition metric; and ii) a correlation metric.

The transition metric is a representation of the number of transitions from black to white. Transitions can be represented, e.g., in terms of extrema. For example, in FIG. 7B, a scanline across a bounding box representing UPC-A barcode (FIG. 7A) yield about 60 extrema. Extrema can be determined for waveforms representing scanlines, and the number of such can be used in comparison to a metric to determine whether to keep ID data values processed from such scanlines. For example, with reference to FIG. 10, the threshold can be set to around, e.g., 36 extrema, with scanlines have such or more being accepted.

Figure 10:
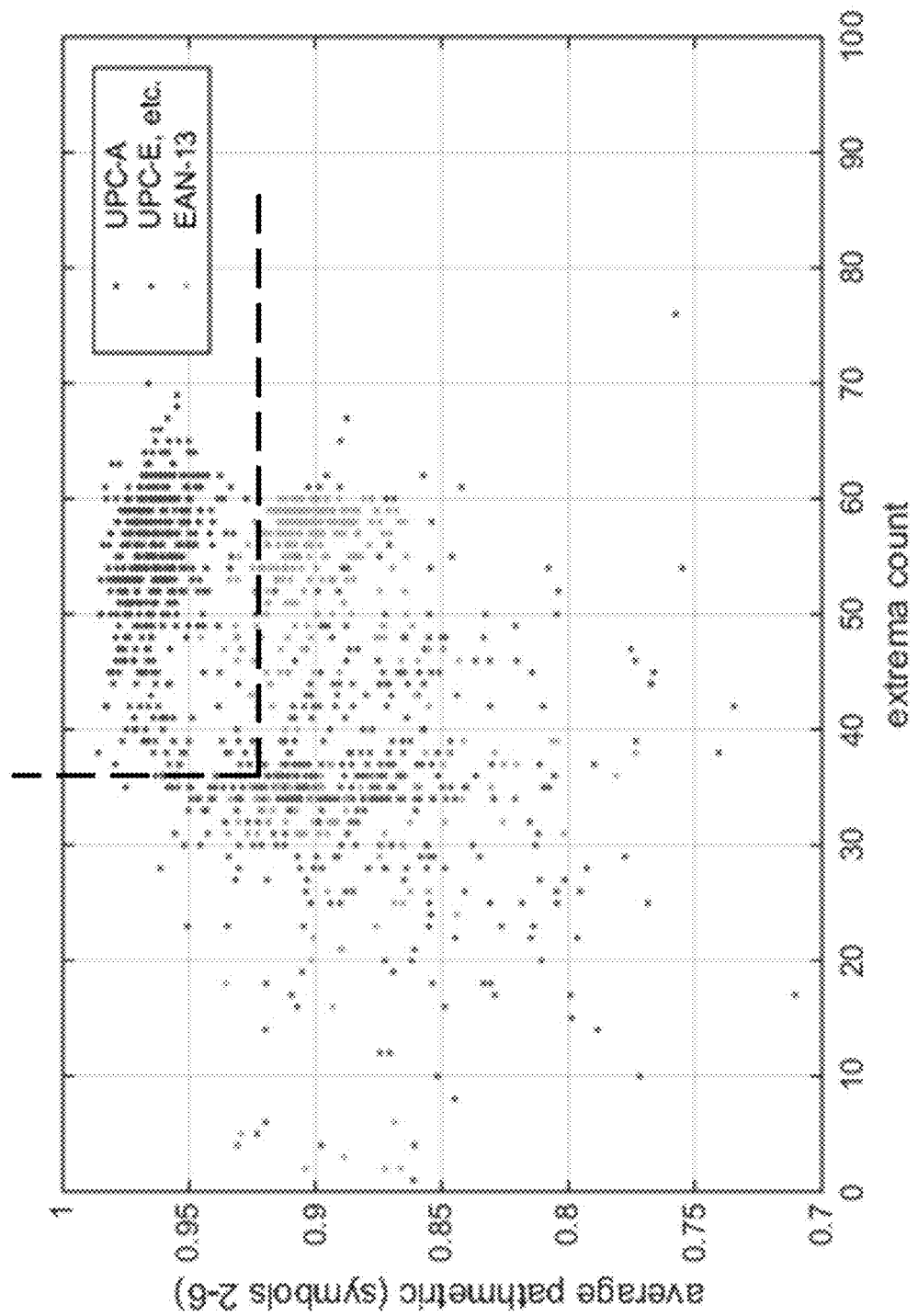
FIG. 10 is a diagram showing a threshold for two different metric in a second misread recognizer.

FIG. 10 combines another metric (the correlation or average path metric) with the transition metric. The correlation is configured to weed out different symbologies, e.g., EAN-13 symbols, which have a similar data format to UPC-A, but which has two code books for symbols 2-6. The correlation metric determines a correlation to an expected known signal (e.g., a symbol comprising 7 bits) with the input waveform signal (e.g., a scanline signal). This correlation can be repeated for each digit within a scanline. In some implementations we can run this correlation across multiple different scale factors and for different blur-transformed versions of the image data. The result of different correlations can be averaged or variously combined to yield an overall correlation metric. We have found that a relatively high correlation value (>90%) helps weed out potential misreads. For example, returning to FIG. 10, a threshold can be set that includes an extrema count (e.g., above 35 or so) and a bit correlation count (e.g., above about 90%, e.g., above 92%). The reads within that dashed lines in FIG. 10 can be accepted as likely valid decodes. These thresholds are provided by way of example. Other examples include, e.g., requiring a bit correlation above 75%, 80%, or 85%, and an extrema count about 28, 30 or 32. For implementation, when a scanline fails the first or second recognizer a flag can be set which allows a program to, e.g., not present a decoded value, display an error message, and/or continue searching for a valid barcode.

Additional Features

The following features can be used as additional validation metrics or decoding aids. These can be used all together, or in various combinations and subsets.

Machine-learning-based decoder pooling: As part of a decoder stack, there may be a plurality of decoders competing to decode a barcode. Each of the decoders may be designed to decode scanlines under a different regime (e.g., blurred, regular, decoder with aggressive scale change mode, 1D-only decoder, 2D-only decoder, etc.). Different valid barcode ID codes may be output by two or more decoders. Along with each valid ID code, statistics describing the condition under which the ID code was produced, such as a blurriness metric, correlation value, correlation value of the second winning code, etc., can be collected. Given representative training samples, a classifier can be trained to predict probability of a current ID code being valid and use it to reduce misreads. In particular, a correlation value of the second winning ID code within the same decoder (e.g., mode) and between different decoders is a metric that can describe how confident the decoder is with a choice.

Symbol wise voting: A detector can be configured to select an ID (e.g., the decoded number from a barcode) based on a statistical mode (e.g., the most common value) of all scanline outputs. In an alternative implementation, the ID is determined by combining decoded symbols from all scanlines, or a set of scanlines, or even partially decoded scanlines. Each symbol in the output ID is the statistical mode of the respective decoded symbol in each of the scanlines. Alternatively, we may compute the mode only over those scanlines which decode completely or scanlines which decode completely and pass the checksum symbol.

In a case where two bounding boxes are selected from localization, and two IDs are determined, one from each of the boxes, how to select which ID to output? Two options follow:

1. Best of both: Output the ID which passes the checksum. If neither passes, no ID is output. If both IDs pass, choose one at random or in a predetermined manner. This increases both the robustness and the misread rate.
2. Consistency: Output the ID only if the results from the two voting schemes match. This decreases both the robustness and the misread rate.

Signal aided voting: We may map the quality of the data across a scanline prior to decoding to exclude symbols from the vote. Symbols may be erased due to glare, shadows, reflections, dirt, soiling, markings, over-wrap occlusion, package folding, etc. By mapping this erased data to the output of each decoded scanline, we may combine only the reliably decoded data across all scanlines using the symbol based voting schemes discussed above. This will allow recovery of a barcode ID code even when none of the individual decoder outputs recover all the symbols. An alignment process which will align the respective symbols from each decoded scanline can be used before taking a symbol-wise vote. Symbols across scanlines may be misaligned due to warping of the package, rotation and perspective.

Multi-frame processing: A decoder can be configured to process each image frame independently and combine ID codes from successive frame (e.g., before reporting a successful read, the same ID must be found in a percentage or number of preceding frames). In an alternative, scanline data can be pooled across multiple frames and apply a classifier and voting scheme on the pooled data. This may also help in packages in which the barcode is partially visible in each frame, for example when a barcode wraps around a corner and half the barcode is visible in one frame and the other half is visible in a successive frame.

Efficient decoding: In addition, localization need not be carried out on every frame. Instead, bounding box co-ordinates can be carried over from a preceding frame to the next frame(s). We could look for the barcode near the previous bounding box and adjust the current bounding box. We may also use the same bounding box for multiple frames and simply extract scanlines and process as usual, assuming the barcode has not moved too far from the location in the previous frame. Additional padding can be used around a bounding box carried to a successive frames.

Lowest quartile strength: A lowest quartile strength can be used as a validation metric. Average recovery strength of the three symbols with the lowest correlation can computed and compared to a threshold. Lower scores are an indicator that something may have gone wrong during decoding. The output ID can be flagged as suspect or discarded if the average does not meet or exceed the threshold.

26 metric: The so-called "26 metric" can be used as another validation metric. Here, the average correlation of symbols two through six is computed. The correlation value can be used to help distinguish between UPC-A codes and its superset of EAN-13 codes. It can also be used for reducing false positives and misreads.

Mid synch correlation: This correlation with a fixed-symbol at center of the barcode can be computed and used to determine a misread. A low metric indicates that something may have gone wrong during decoding.

Code Group Creation: Results for all decoded scanlines can be grouped by mode. For example, the first group contains the results for all scanlines decoded L2R using non-adaptive scale. Each mode group can be further subdivided into code groups (CG). One code group is created for each unique set of decoded symbols in a given mode group. For example, if all scanlines in the mode group decode to the same set of symbols, a single CG is created. Otherwise, plural CGs are created. A CG is represented by a unique ID (its symbol string) and is described by a set of features that are useful for validating the CG. The features are comprised of two parts. The first part is a combination of all decoded data and scanline feature data from scanlines in the parent mode group that match the CG ID. The second part is a combination of all decoded data and scanline feature data from scanlines in the mode group that DO NOT match the CG ID. A total of, e.g., fourteen features, can be used to describe each CG. The first feature is CG consistency, which is the ratio of the number of decoded scanline results that match the CG ID to the total number of scanlines. The next set of six features is obtained by taking the individual sets of six initial features from all matching scanlines in the CG and averaging them. The set of seven non-matching features is obtained in an analogous fashion. For example, the first non-matching features is CG inconsistency, which is the ratio of the number of decoded scanline results that DO NOT match the CG ID to the total number of scanlines, etc. Note that CG consistency and CG inconsistency do not necessarily add to one. This is because to be counted as either a CG match or a CG non-match the decoded result for any given scanline must be valid, which is often not the case. These features can be used as another validation metric.

Code Group Validation: Machine learning (ML) in the form of logistic regression can be used to "learn" what feature vectors constitute a valid CG. The ML procedure can be biased in favor of rejecting misreads, meaning it results in having a very low rate of deciding that an invalid CG is a valid one. The output of the ML training procedure is a set of weights that are applied to the CGs and a threshold that is used to establish CG validity. After the CGs for each of the mode groups are created, the learned weight vector can be applied to each CG's feature vector to generate CG metrics. The CG with the highest metric is deemed most likely of the bunch to constitute a valid decode. If the metric of this CG is both above a threshold used to control the false positive rate, and the CG's symbol string has a valid checksum, decoding success is declared.

Image quality: A barcode decoder may provide information about the focus quality, motion blur or light quality in a frame. In case of motion, a higher frame rate may be processed. In case of poor light in a frame, the barcode decoding application could interface (e.g., via operating system APIs) with the camera LED or Flash to activate for the next frame(s). Alternatively, the image data can be registered in a bounding box across frames and average pixels across frames to reduce the low light pixel noise.

Scanline health: Instead of selecting scanlines uniformly, scanlines are selected based on some measure of scanline health (e.g., sample value continuity, distance between extrema, etc.), but also take into account that a certain amount of diversity should be used. MatLab source code for such an operation is included as part of this application as Appendix_B.txt. Appendix_B.txt is hereby incorporated herein by reference in its entirety.

Validating Strings: A method for validating partial symbol strings, or disambiguating them from competing symbol strings, is now discussed. This process operates on subsets of symbols at a time. The concatenation of all validated symbol strings constitutes the decoded barcode. Among other things, this would allow recovery of the barcode symbols under conditions in which no one scanline is decodable on its own. The process may include:

Given a collection of decoded scanline symbols, metrics, and state information, look for consistent symbol streaks, where a streak is an arbitrary number of symbols that decoded to the same value, irrespective of decoder mode.

For example, look for streaks of size six that start at the first symbol location.

Compute a histogram, where each bin corresponds to a particular streak value.

Select a group of scanlines that has the streak that corresponds to the histogram peak; e.g., the most consistent streak.

Choose a scanline from the chosen group and obtain its position vector from the decoded results—the estimates of the start of every symbol relative to the beginning of the scanline.

Use linear regression to fit a low-order polynomial to the position vector and then use this fit to generate a refined position vector.

Now, for each symbol, get the template for the target symbol and extract data from the scanline at the appropriate position using the refined position vector.

Measure correlation with other symbol templates at this position to get an estimate of how close we are to symbol collision.

Attempt to map the template to the observed data, again using linear regression. There are multiple possibilities for the type of mapping that is applied here depending upon previous observations. Common examples include:

Amplitude non-linearity from printing process

Blur kernel due to focus problem.

Amplitude gradient due to lighting change.

If the amplitude transformation is expected to be relevant to all symbols in the streak, repeat the above for all such symbols and average the resulting transform. Otherwise, keep the amplitude transforms separate.

Apply the transform(s) to each of the templates and measure the MSE fit with the data. Results that have low enough MSE validate the estimated symbol value.

Repeat with other candidates from the same streak or other streaks until validation is successful or the pool of data is exhausted.

Direct Thermal Printing

In a direct thermal system, heat from a print head causes a chemical reaction on thermo-sensitive paper resulting in a black image on the paper. The printer sends an electrical current to heating elements of the thermal print head, which generate heat. The heat activates the thermo-sensitive layer of the thermo-sensitive paper, which changes color where heated. The heating elements can be arranged as a matrix of small closely spaced dots.

A problem occurs when one (or adjacent) heating elements fail, particularly when printing vertical lines that are found in UPC barcodes. An entire line of the barcode can be inadvertently omitted due to failed heating elements. A solution is to print vertical lines at an angle. Printing a vertical line at an angle will ensure that multiple, different heating elements contribute to a vertical line. Thus, even if one element has failed, other heating elements will contribute (e.g., print) to the angled bar as the thermo-sensitive paper advances.

The barcode can be angled digitally in software (e.g., via a print driver or point of sale system) prior to printing.

Figure 12:
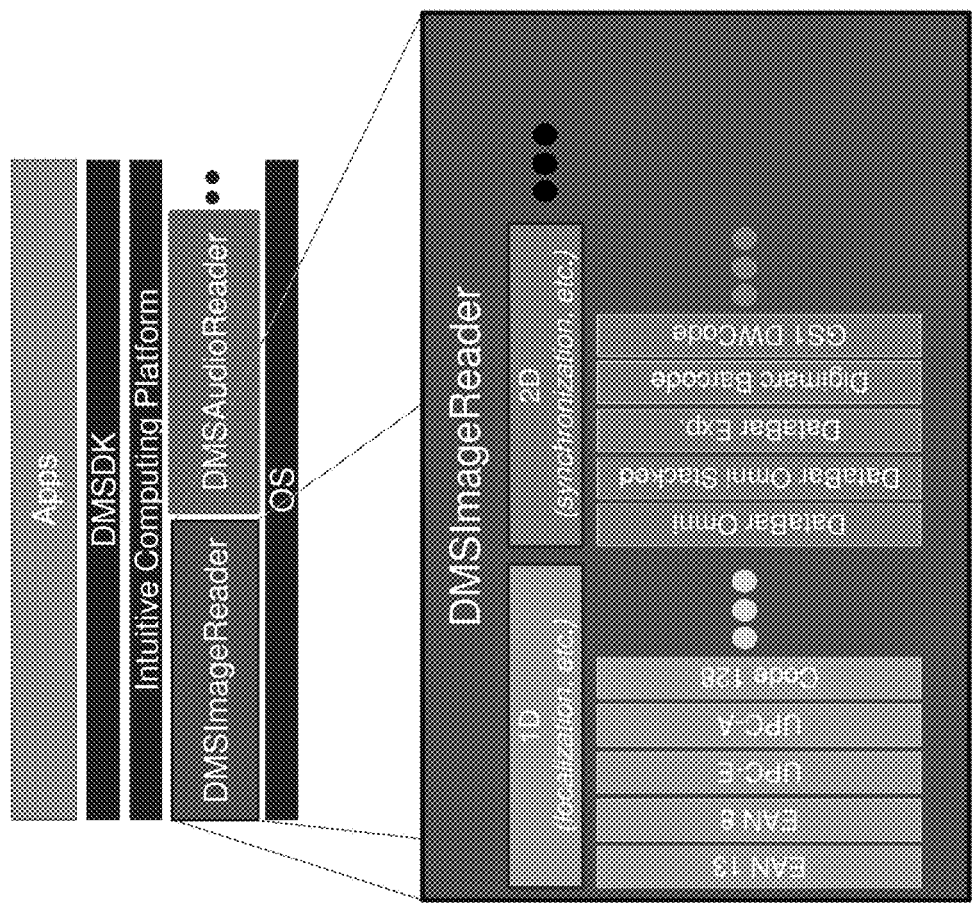
FIG. 12 is a diagram showing an integrated architecture including a barcode detector.

Implementations and Operating Environments:

One implementation of a barcode decoder is in the form of a software SDK (software development kit), which can be called by or integrated into various smartphone applications ("apps"). These apps can be stored on a smart phone and executed by one or more smart phone processors. For example, and with reference to FIG. 12, the SDK ("DMSDK") may include various signal detection modules including, e.g., an image reader module ("DMSImageReader") and an audio reader module ("DMSAudioReader"). The image reader module may include a barcode decoder as described in this patent document. It may also include other symbology readers including, e.g., a digital watermark detector. Further, so-called "image recognition" processes can be implemented in the image reader module as well.

The audio reader module may analyze audio signals in search of encoded signals, or to generate fingerprints (e.g., hashes or reduced-bit representations) of the audio signals.

Figure 13:
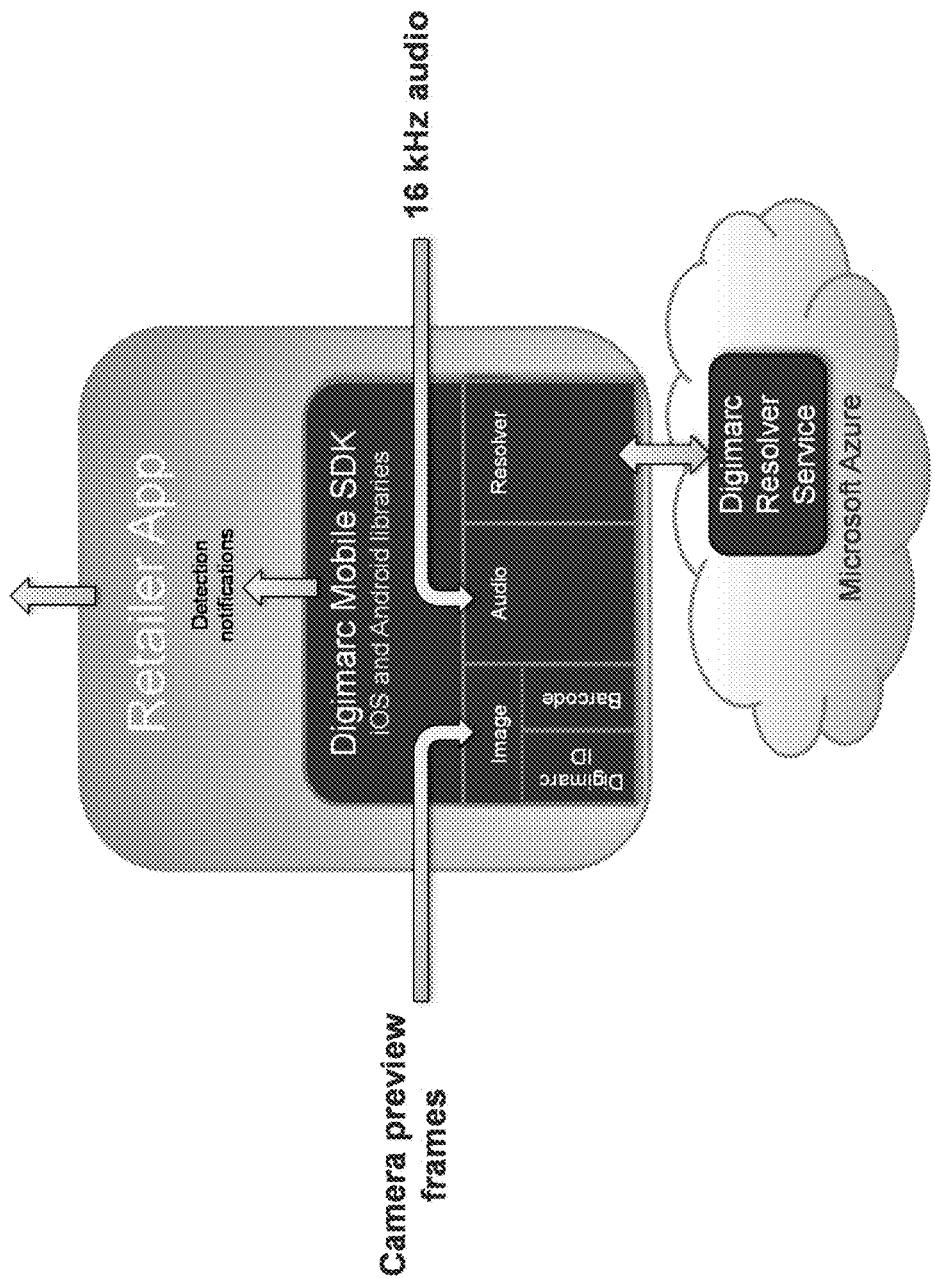
FIG. 13 is a diagram showing a smart phone application including a barcode decoder.

With reference to FIG. 13, one app integration includes the barcode decoding disclosed herein, including access to a resolver service. The resolver service provides information associated with decoded symbologies such as digital watermarks and barcodes. Further details regarding a resolver service is described in assignee's U.S. Pat. No. 8,990,638, which is hereby incorporated herein by reference in its entirety.

Another implementation of a barcode decoder is electronic circuitry that has been custom-designed and manufactured to perform some or all of the component acts, as an application specific integrated circuit (ASIC).

To realize such an implementation, some or all of the technology is first implemented using a general purpose computer, using software such as MatLab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

The components and operations of a barcode decoder can also be implemented in modules. For example, the components and operations identified in FIG. 11 can be implemented in modules. Notwithstanding any specific discussion of the embodiments set forth herein, the term "module" may refer to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as one or more computer processors comprising one or more individual instruction processing cores, state machine circuitry, or firmware that stores instructions executed by programmable circuitry.

Figure 14:
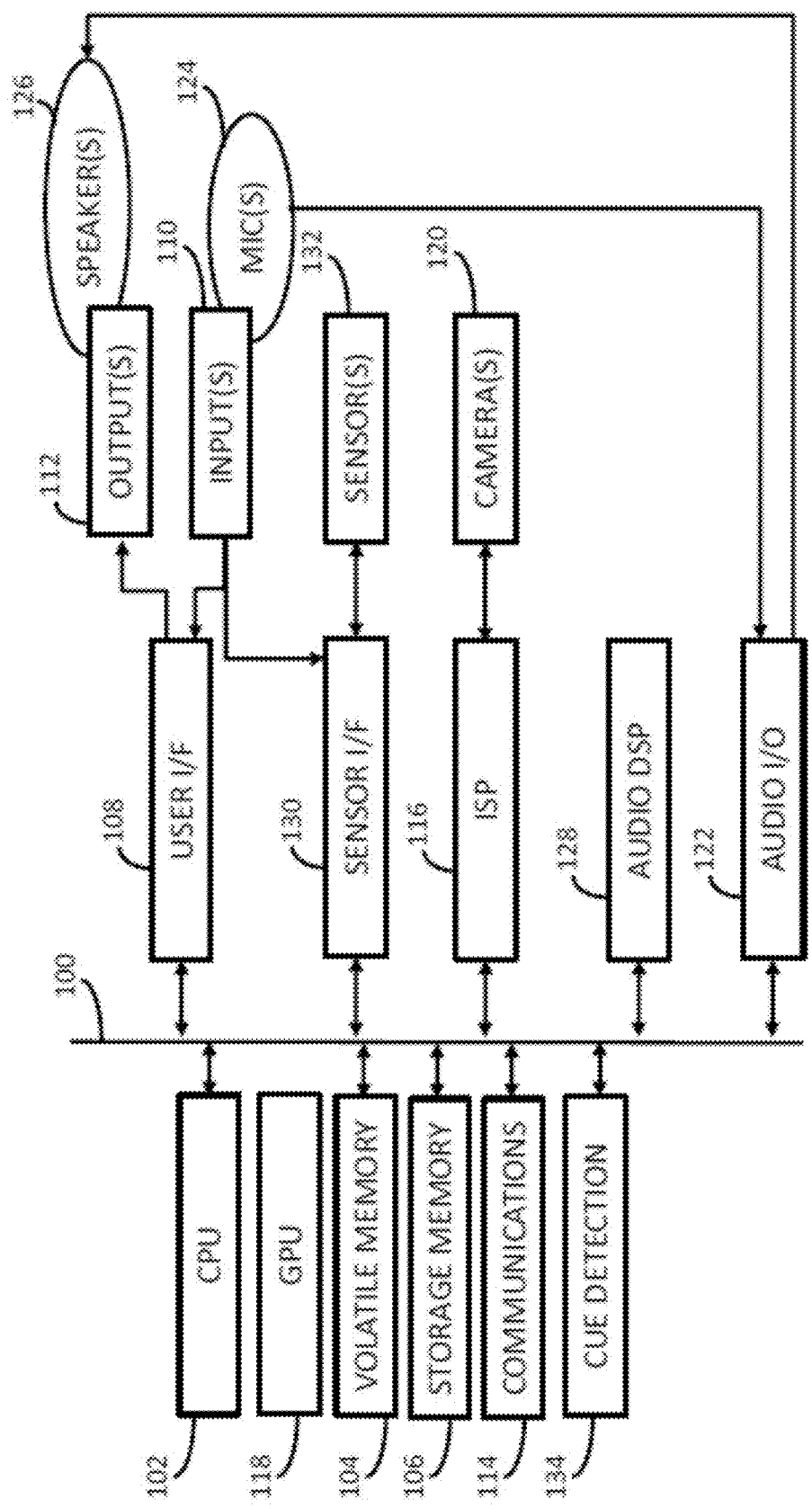
FIG. 14 illustrates an electronic device in which a barcode detector may be implemented.

For the sake of illustration, FIG. 14 is a diagram of an electronic device in which the components of the above barcode decoder embodiments may be implemented. It is not intended to be limiting, as the embodiments may be implemented in other device architectures or electronic circuitry, or in devices including a sub-set of the components illustrated in FIG. 14. In one example, the electronic device of FIG. 14 comprises a smart phone or tablet. In another example, the electronic device comprises a point of sale (POS) scanner. In still another example, the electronic device is included in a larger system or apparatus.

Referring to FIG. 14, a system for an electronic device includes bus 100, to which many devices, modules, etc., (each of which may be generically referred to as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 14 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be one or more microprocessors, mobile application processors, etc., known in the art (e.g., a Reduced Instruction Set Computer (RISC) from ARM Limited, the Krait CPU product-family, any X86-based microprocessors available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device.

The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104.

The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present disclosure, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114).

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 14, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110.

The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Concluding Remarks:

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety. Such documents are incorporated in their entireties, even if cited above in connection with specific of their teachings. These documents disclose technologies and teachings that can be incorporated into the arrangements detailed herein (including the arrangements in Appendix_A.txt, Appendix_B.txt and Appendix_C.txt), and into which the technologies and teachings detailed herein can be incorporated.

The methods, processes, components, apparatus and systems described above, including those in Appendix_A.txt, Appendix_B.txt & Appendix_C.txt, may be implemented in hardware, software or a combination of hardware and software. For example, a barcode decoder may be implemented in firmware, hardware, combinations of software, firmware and hardware, a programmable computer, electronic processing circuitry, processors, parallel processors, multi-core processors, and/or by executing software or instructions with processor(s) or circuitry. In particular, a specific implementation of the present disclosure can operate on a configured smartphone (e.g., iPhone 6 or Android device). The smart phone includes one or more processors, memory, a touch screen display, and one or more cameras to capture optical scan data. The optical scan data can be analyzed to localize and/or decode a barcode represented therein. The Localization and Decoding processes may be managed by software (e.g., an App) resident on the smartphone device.

The methods and processes described herein including in Appendix_A.txt (e.g., UPC barcode decoder), Appendix_B.txt (e.g., scanline selector) and Appendix_C.txt (e.g., Code39 barcode decoder) also may be implemented in software programs (e.g., written in C, C++, MatLab, Visual Basic, Java, Python, Tcl, Perl, Scheme, Ruby, executable binary files, etc.) stored in memory (e.g., a computer readable medium, such as an electronic, optical or magnetic storage device) and executed by one or more electronic processors (or electronic processing circuitry, hardware, digital circuit, etc.).

The particular combinations of elements and features in the above-detailed embodiments are exemplary only; the interchanging and substitution of these teachings with other teachings in this and the incorporated-by-reference patents are also contemplated.

What is claimed is:

1. An image processing apparatus comprising:
an image sensor for obtaining data representing imagery corresponding to a physical object comprising printing therein on, said printing comprises a 1D barcode, the 1D barcode carrying a barcode identifier (ID);
a display screen for displaying information associated with the 1D barcode;
memory for storing a plurality of barcode symbol templates, wherein the plurality of barcode symbol templates comprises a digit template for each numerical digit 0-9 and one or more symbol templates for synchronization symbols, wherein for each numerical digit 0-9 the plurality of barcode symbol templates comprises one or more scaled versions of the digit template, and wherein each of the one or more symbol templates comprises a plurality of elements;
one or more processors configured for:
analyzing a scanline representing a portion of the data representing imagery by correlating information associated with one or more suspected barcode symbols within the scanline with the plurality of barcode symbol templates and the one or more symbol templates;
updating an estimated scale of the scanline based upon a result of the correlating in which a scale estimate for a current suspected barcode symbol is updated based on a scale obtained from a previous suspected barcode symbol; and then
detecting the barcode ID based on said analyzing and said updating;
controlling display of the information associated with the 1D barcode on said display screen.

2. The image processing apparatus of claim 1 in which said one or more processors are configured for analyzing a plurality of scanlines.

3. The image processing apparatus of claim 2 in which prior to controlling display of the information associated with the 1D barcode, the one or more processors operate to validate the barcode ID.

4. An image processing apparatus comprising:
an image sensor for obtaining data representing imagery;
memory for storing a plurality of barcode symbol templates, wherein the plurality of barcode symbol templates comprises a digit template for each numerical digit 0-9 and one or more symbol templates for synchronization symbols, wherein for each numerical digit 0-9 the plurality of barcode templates comprises one or more scaled versions of the digit template, and wherein each of the one or more symbol templates comprises a plurality of elements;
one or more processors configured for:
analyzing a plurality of scanlines representing a portion of the data representing imagery by correlating information associated with one or more suspected barcode symbols within the plurality of scanlines with the plurality of barcode symbol templates and the one or more symbol templates;
updating an estimated scale of the scanline based upon a result of the correlating; validating a barcode ID by: i) applying a first recognizer including a blur metric and an output metric to the plurality of scanlines representing the portion of the data representing imagery, the blur metric including a representation of an average absolute value difference between consecutive sample values of a scanline, in which the output metric indicates a mode occurrence for decoded barcode identifiers corresponding to the plurality of scanlines; and ii) filtering out potential barcode reads falling below a threshold value for the blur metric and the output metric; and
outputting the barcode ID associated with the plurality of scanlines.

5. The image processing apparatus of claim 4 in which said one or more processors are configured for: applying a transition metric to the plurality of scanlines, the transition metric comprising a number of extrema found in a scanline, and filtering out potential barcode reads falling below a threshold value for the transition metric.

6. The image processing apparatus of claim 5 in which said one or more processors are configured for: applying a correlation metric to the plurality of scanlines, the correlation metric representing a correlation between an expected known signal and a scanline value, and filtering out potential barcode reads falling below a threshold value for the correlation metric.

7. A smart phone comprising the image processing apparatus of claim 1, in which said smartphone comprises a camera, the camera comprising the image sensor.

8. The image processing apparatus of claim 1 in which the plurality of templates comprise overlapping templates, in which an overlapping template comprises symbol elements corresponding to a first symbol and comprises a subset of symbol elements corresponding to a symbol preceding the first symbol.

9. A non-transitory computer readable medium comprising instructions stored therein that, when executed by one or more processors, cause the one or more processors to perform the following:
obtain data representing imagery corresponding to a physical object comprising printing therein on, the printing comprises a 1D barcode, the 1D barcode carrying a barcode identifier (ID);
access a plurality of barcode symbol templates, wherein the plurality of barcode symbol templates comprises a digit template for each numerical digit 0-9 and one or more symbol templates for synchronization symbols, wherein for each numerical digit 0-9 the plurality of barcode symbol templates comprises one or more scaled versions of the digit template, and wherein each of the one or more symbol templates comprises a plurality of elements;
analyze a scanline representing a portion of the data representing imagery by correlating information associated with one or more suspected barcode symbols within the scanline with the plurality of barcode symbol templates and the one or more symbol templates, and
update an estimated scale of the scanline based upon a result of the correlating, in which a scale estimate for a current suspected barcode symbol is updated based on a scale obtained from a previous suspected barcode symbol; and then
detect the barcode ID based on said analyzing and said updating;
control display of information associated with the barcode ID on a display screen.

10. The non-transitory computer readable medium of claim 9 in which the analyze a scanline is configured to analyze a plurality of scanlines.

11. The non-transitory computer readable medium of claim 9 in which the plurality of templates comprise overlapping templates, in which an overlapping template comprises symbol elements corresponding to a first symbol and comprises a subset of symbol elements corresponding to a symbol preceding the first symbol.

12. A non-transitory computer readable medium comprising instructions stored therein that, when executed by one or more processors, cause the one or more processors to perform the following:
  obtaining data representing imagery;
  accessing a plurality of barcode symbol templates, wherein the plurality of barcode symbol templates comprises a digit template for each numerical digit 0-9 and one or more symbol templates for synchronization symbols, wherein for each numerical digit 0-9 the plurality of barcode templates comprises one or more scaled versions of the digit template, and wherein each of the one or more symbol templates comprises a plurality of elements;
  analyze a plurality of scanlines representing a portion of the data representing imagery by correlating information associated with one or more suspected barcode symbols within the plurality of scanlines with the plurality of barcode symbol templates and the one or more symbol templates;
  update an estimated scale of the scanline based upon a result of the correlating;
  validate a barcode ID by: i) applying a first recognizer including a blur metric and an output metric to the plurality of scanlines representing the portion of the data representing imagery, the blur metric including a representation of an average absolute value difference between consecutive sample values of a scanline, in which the output metric indicates a mode occurrence for decoded barcode identifiers corresponding to the plurality of scanlines; and ii) filtering out potential barcode reads falling below a threshold value for the blur metric and the output metric; and
  control outputting of the barcode ID associated with the plurality of scanlines.

13. The non-transitory computer readable medium of claim 12 in which the instructions comprise instructions to: apply a transition metric to the plurality of scanlines, the transition metric comprising a number of extrema found in a scanline, and to filter out potential barcode reads falling below a threshold value for the transition metric.

14. The non-transitory computer readable medium of claim 13 in which the instructions comprise instructions to: apply a correlation metric to the plurality of scanlines, the correlation metric representing a correlation between an expected known signal and a scanline value, and to filter out potential barcode reads falling below a threshold value for the correlation metric.

\* \* \* \* \*